(12) United States Patent
Alkhateeb et al.

(10) Patent No.: US 12,068,813 B2
(45) Date of Patent: *Aug. 20, 2024

(54) MASSIVE MIMO SYSTEMS WITH WIRELESS FRONTHAUL

(71) Applicant: ARIZONA BOARD OF REGENTS ON BEHALF OF ARIZONA STATE UNIVERSITY, Scottsdale, AZ (US)

(72) Inventors: Ahmed Alkhateeb, Chandler, AZ (US); Umut Demirhan, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/324,589

(22) Filed: May 26, 2023

(65) Prior Publication Data
US 2023/0299817 A1 Sep. 21, 2023

Related U.S. Application Data

(63) Continuation of application No. 17/547,675, filed on Dec. 10, 2021, now Pat. No. 11,742,902.
(Continued)

(51) Int. Cl.
*H04L 1/02* (2006.01)
*H04B 7/0452* (2017.01)

(52) U.S. Cl.
CPC ................. *H04B 7/0452* (2013.01)

(58) Field of Classification Search
CPC ........... H04L 27/2655; H04L 27/2666; H04W 72/0406; H04W 92/20; H04W 16/28;
(Continued)

(56) References Cited

U.S. PATENT DOCUMENTS

| 11,283,475 B1* | 3/2022 | Tsai ..................... H04W 28/20 |
| 2014/0206368 A1 | 7/2014 | Maltsev et al. |

(Continued)

OTHER PUBLICATIONS

Demirhan et al. "Enabling Cell-Free Massive MIMO Systems with Wireless Millimeter Wave Fronthaul," School of Electrical, Computer and Energy Engineering, Arizona State University, Oct. 5, 2021, 30 pages.

*Primary Examiner* — Khai Tran
(74) *Attorney, Agent, or Firm* — MH2 TECHNOLOGY LAW GROUP LLP

(57) ABSTRACT

A communications network system is disclosed. The system may include a central processing unit (CPU) in data communication with a first access point (AP) configured to enable a data communication between the CPU and a first user equipment (UE). The CPU may include a processor configured to select a first group of APs including the first AP, establish a first data communications link over a first frequency band between the CPU- and the first AP, cause the first AP to establish a second data communications link over a second frequency band between the first AP and the first UE, and transmit a portion of data to the first AP over the first data communications link. The first data communications link may be a wireless data communications link. The first frequency band may include higher frequency levels than those of the second frequency band.

20 Claims, 10 Drawing Sheets

Related U.S. Application Data

(60) Provisional application No. 63/123,680, filed on Dec. 10, 2020.

(58) Field of Classification Search
CPC ............. H04W 84/045; H04W 56/003; H04W 56/004; H04W 88/08; H04B 7/0486; H04B 7/063
USPC .......................................... 375/267, 260, 262
See application file for complete search history.

(56) References Cited

U.S. PATENT DOCUMENTS

| | | |
|---|---|---|
| 2019/0132880 A1* | 5/2019 | Byun .................. H04W 72/046 |
| 2019/0141617 A1 | 5/2019 | Abedini et al. |
| 2022/0304087 A1* | 9/2022 | Iyer ...................... H04W 24/08 |

* cited by examiner

MASSIVE MIMO SYSTEMS WITH WIRELESS FRONTHAUL

CROSS-REFERENCE TO RELATED APPLICATIONS

This application is a continuation of U.S. Non-provisional application Ser. No. 17/547,675 filed Dec. 10, 2021, pending, which claims priority to and the benefit of U.S. Provisional Application No. 63/123,680, entitled "MASSIVE MIMO SYSTEMS WITH WIRELESS FRONTHAUL," filed on Dec. 10, 2020, expired. The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to wireless communication, and in particular to cell-free massive multiple-input multiple-output (MIMO) systems.

BACKGROUND

Densification of the wireless infrastructures has been a solution in achieving high data rates through the evolution of the wireless communication systems. Network densification is a solution for the high data rate demands in, e.g., 3GPP (3rd Generation Partnership Project) 5G (Fifth Generation) networks and beyond. This densification, however, requires a high-level of network coordination which is associated with extensive control overhead. Thus, as an alternative solution, a new approach relating to a cell-free (distributed) massive MIMO system has been proposed to meet the high data rate demands. In this approach, a network that covers a large area may be considered as a single cell with one central processing unit connected to a large number of distributed antenna terminals/access points via optical fiber/wired links. While this alternative approach is theoretically interesting and enables coverage and data rate gains, systems that rely on optical fiber connections are associated with very expensive and difficult deployment. For example, prior designs of systems related to this alternative approach relied on using optical fiber fronthaul network for connecting the central processing unit with the distributed access point terminals. They made deploying these systems both difficult and expensive, increasing the infrastructure cost, leading to high installation time, and limiting the deployment flexibility and adaptability. Accordingly, improved systems and methods are desirable.

SUMMARY

In various embodiments, systems, methods, and articles of manufacture (collectively, the "system") for a massive multiple-input multiple-output (MIMO) system with a wireless fronthaul network are disclosed. In various embodiments, the system may include a central processing unit (CPU) in data communication with a first access point (AP) configured to enable a data communication between the CPU and a first user equipment (UE), the CPU including a processor coupled with a plurality of antenna elements and configured to: select a first group of APs including the first AP to provide the data communication between the CPU and the first UE; establish a first data communications link over a first frequency band between the CPU and the first AP; cause the first AP to establish a second data communications link over a second frequency band between the first AP and the first UE; and transmit, via beamforming by the plurality of antenna elements, a portion of data to the first AP over the first data communications link, the portion of the data configured to be relayed via the first AP to the first UE over the second data communications link; wherein: the first data communications link and the second data communications link each include a wireless data communications link; the first frequency band includes higher frequency levels than those of the second frequency band; and the first group of APs or the first AP is configured to transmit data to a plurality of UEs including the first UE.

In various embodiments, the processor of the CPU may be further configured to: establish first additional data communications links over the first frequency band between the CPU and, respectively, other APs of the first group of APs; cause each one of the other APs of the first group of APs to establish a respective second additional data communications link over the second frequency band between the each one of the other APs and the first UE; and transmit, via beamforming by the plurality of antenna elements, other portions of the data to the other APs of the first group of APs over the respective second additional data communications links, the other portions of the data configured to be relayed via the other APs to the first UE. In various embodiments, the processor of the CPU may be further configured to: obtain an end-to-end data rate of the data communication between the CPU and the first UE; based on the obtained end-to-end data rate not exceeding a predetermined threshold, adjust the first group of APs by selecting a different group of APs; transmit additional data from the CPU to the first UE via the different group of APs; and achieve a higher end-to-end data rate for the transmission of the additional data than the obtained end-to-end data rate. In various embodiments, the processor of the CPU may be further configured to: achieve the higher end-to-end data rate than the obtained end-to-end data rate by at least one of adjusting beamforming vectors, adjusting a data transmission schedule, or causing adjustment of power coefficients associated with one or more APs. In various embodiments, the processor of the CPU may be further configured to: transmit data simultaneously to a plurality of groups of APs including the first group of APs each configured for data communication with one or more UEs. In various embodiments, the first frequency band may include a millimeter wave (mmWave) frequency band or a terahertz (THz) frequency band. In various embodiments, the second frequency band may include a sub-6 gigahertz (GHz) frequency band or a millimeter wave (mmWave) frequency band. In various embodiments, the beamforming may include an analog beamforming, a digital beamforming, or a hybrid beamforming. In various embodiments, the processor of the CPU may be further configured to: cause the first AP to establish a wired data communications link with one or more APs to send additional data to at least the first UE via the first data communications link and the wired data communications link; and transmit, via beamforming by the plurality of antenna elements, at least portions of the additional data to the first AP, the at least portions of the additional data configured for transmission to at least the first UE via the wired data communications link. In various embodiments, the communications network system may include a cell-free massive multiple-input multiple-output (MIMO) system.

In various embodiments, the beamforming may include an analog beamforming, a digital beamforming, or a hybrid beamforming. In various embodiments, the methods may include distributing, via the first AP and the wired data communications link, information relating to synchronization or power signaling. In various embodiments, the methods may include transmitting, via the first group of APs, data to other UEs in data communication with the first group of APs.

The foregoing features and elements may be combined in various combinations without exclusivity, unless expressly indicated herein otherwise. These features and elements as well as the operation of the disclosed embodiments will become more apparent in light of the following description and accompanying drawings. The contents of this section are intended as a simplified introduction to the disclosure, and are not intended to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
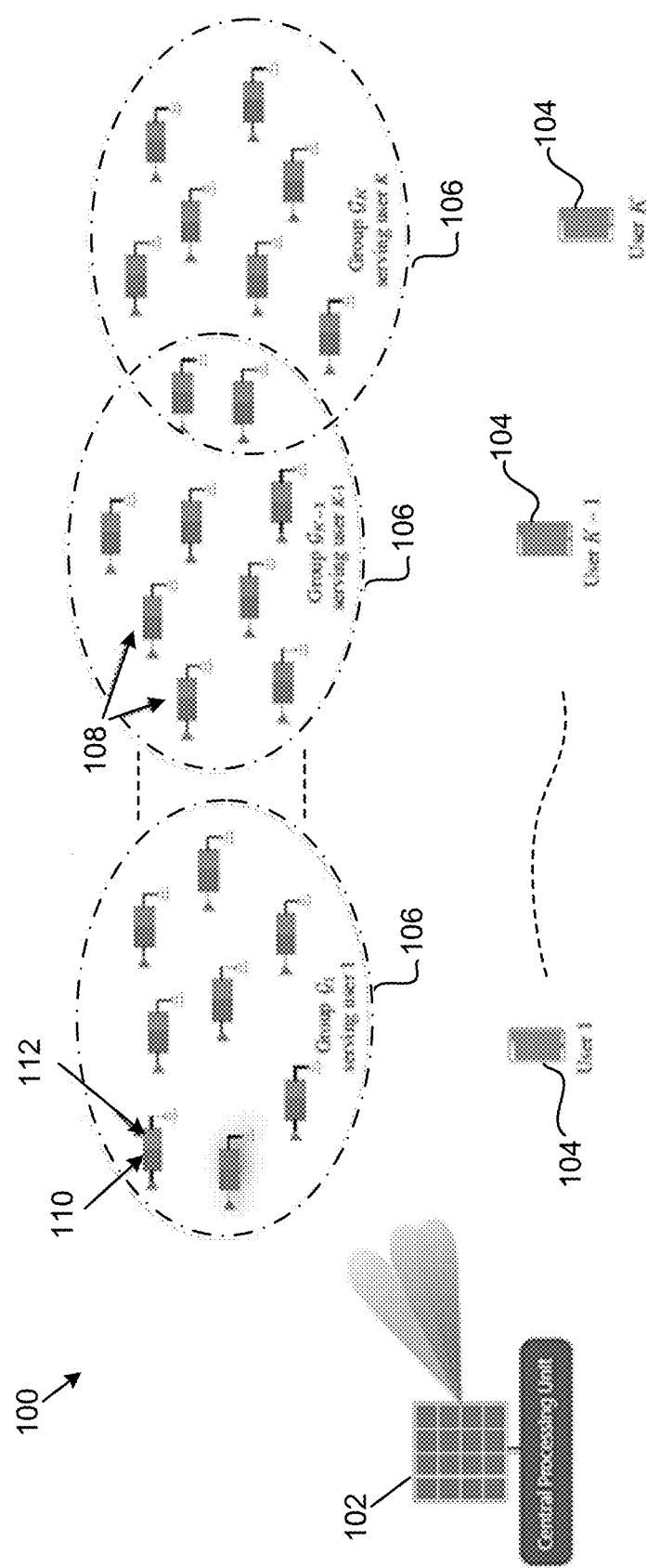
FIG. 1 is a diagram illustrating components of a cell-free massive multiple-input multiple-output (MIMO) system in accordance with various exemplary embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "information," or the like may include encompassing information such as commands, queries, files, messages, data for storage, and the like in digital or any other form.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Systems, methods, and computer program products are provided. In the detailed description herein, references to "various embodiments," "one embodiment," "an embodiment," "an example embodiment," etc. indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments related to the present disclosure, a cell-free massive multiple-input multiple-output (MIMO) system and operation and performance thereof are depicted. Exemplary embodiments of the present disclosure develop a system architecture for distributed (cell-free) massive MIMO systems, which is a key component of various wireless communication systems. Distributed (cell-free) massive MIMO systems may achieve high coverage and data rates for served users. The various embodiments of the disclosure present a distributed massive MIMO architecture with a wireless fronthaul network in which (i) the wireless fronthaul network is operating at a higher frequency band compared to access links and (ii) the wireless fronthaul network is supported with directional transmission. Using directional transmission over a high-frequency band in the wireless fronthaul network enables (i) multiplexing the transmission between the distributed access points (APs) while satisfying the higher data rate demands and (ii) achieving accurate frequency, time, and phase synchronization to the APs/distributed nodes (by, e.g., leveraging the high-frequency signal characteristics). These advantages provide an economic and simple approach for realizing the cell-free massive MIMO gains in practice. Moreover, enabling beamforming algorithms and data-rate balancing approaches described herein further demonstrate the advantages of the embodiments described herein. Furthermore, the system architecture described herein may be modular, flexible, and scalable, with low installation cost and time due to the features and elements described herein (i.e., including a wireless fronthaul network).

Moreover, the various embodiments of the disclosure present a system architecture that overcomes the expensive deployment of cell-free massive MIMO systems, creating a practical path for identifying the networks and realizing the distributed massive MIMO gains in practice. It provides an architecture for easing the dense deployment of access points, which is required by current and next-generation wireless communication systems. A key aspect of the disclosed system architecture is to use a wireless fronthaul network operating in a high-frequency band (such as, e.g., millimeter wave (mmWave) or terahertz (THz) bands) to support lower-frequency distributed massive MIMO communication access links (that operate, for example, in a sub-6 gigahertz (GHz) band). The APs utilize a cell-free approach to maximize the data rates of the users, by for example utilizing the time-division duplexing adopted in 3GPP (3rd Generation Partnership Project) 5G (Fifth Generation) networks and expected to become more common in the next-generation communication systems. For example, based on estimated channel coefficients, a central processing unit (CPU) may jointly determine the fronthaul and cell-free massive MIMO transmission parameters (including, e.g., the selection of APs serving the separate users, fronthaul beamforming coefficients, fronthaul timing schedule, and access link power allocation parameters) to balance the rates of the fronthaul and the access channels, and hence, maximizing the end-to-end data rate of the system.

As described further herein, in an exemplary system of a distributed massive MIMO system, the wireless fronthaul network is operating at a higher frequency band compared to the frequency band used in the access channels. For example, the wireless fronthaul network may be operating at a mmWave or THz band while the access network may be operating at a sub-6 GHz band. Various embodiments of the present disclosure present the concept of multi-band cell-free (distributed) massive MIMO system, which provides a feasible and low-cost approach for implementing the cell-free massive MIMO systems and realizing their advantages in practice. The use of directional beamforming and high-frequency large-bandwidth signals at the CPU (for the wireless fronthaul network) provides high data rate and multiplex capabilities that enable serving the distributed (low-frequency) nodes. Further, the same high-frequency signal provides accurate synchronization to these distributed nodes.

Moreover, the disclosed system enables flexible configurations in deploying the distributed antennas (e.g., APs), and do not require connecting all the distributed antennas to a central unit via optical fiber, which imposes strict constraints on the deployment configuration. The use of a high-frequency band in the wireless fronthaul network allows the central unit to beam signals at a high data rate to the distributed nodes. The use of high-frequency signals (with small wavelength and high bandwidth) in the fronthaul network enables the transmission of highly accurate synchronization signals that can be leveraged to synchronize the distributed low-frequency antennas.

For example, the availability of a large bandwidth at the high-frequency band (e.g., a mmWave band) enables the CPU (which would be equipped with, e.g., mmWave transceiver) to support the high data rate in the fronthaul network. In addition, operating the fronthaul network, e.g., in a mmWave band (wherein signals would have a relatively small wavelength) to synchronize, e.g., sub-6 GHz APs (wherein signals would have a much higher wavelength) may ensure precise clock synchronization among the APs. Specifically, the synchronization of the APs may be achieved over, e.g., the mmWave fronthaul network with the aid of the CPU via, e.g., master-slave type algorithms or via network centric solutions as is known in the art. For example, the APs may use two clock signals, one for the mmWave fronthaul network and the other for the sub-6 GHz access network. The APs can synchronize their mmWave clocks and time by referring to the CPU. These signals can then be utilized for more accurate sub-6 GHz synchronization by converting the mmWave (smaller wavelength) signal to a signal based on a larger wavelength clock. For instance, if there are two (2) mmWave clocks that are synchronized with a $\Delta f$ frequency offset between them, the sub-6 GHz clocks obtained from the carrier frequencies (e.g., for 30 GHz and 3 GHz carrier frequencies), it may be possible to obtain the clocks with frequency difference $\Delta f/10$. A similar gain may be expected if a THz-based fronthaul network is leveraged to synchronize a mmWave access channel.

In various embodiments, the disclosed architecture as described herein may assign a group of APs to each user or user equipment (UE) and optimize the multicast beamforming at the CPU to simultaneously serve the AP group of each user or UE. The adopted system model may account for the practical constraints on the higher-frequency band (e.g., mmWave) beamforming architectures.

In various embodiments, the system architecture described herein aims to determine, e.g., the user-centric AP group selection, fronthaul beamforming vectors, group time-division multiple-access (TDMA) schedule, and AP power coefficients to maximize the end-to-end data rates.

In various embodiments, the solution to maximizing the end-to-end data rates as described herein may adopt an iterative group selection algorithm, which may be coupled with the fronthaul and access channel data rate maximization. Specifically, in each iteration, the group size and AP selection may be determined based on the channel estimates, and then the fronthaul/access network data rates may be optimized for the given groups.

Moreover, in various embodiments, a mixed-fronthaul architecture with wire-connected AP clusters (for example through a radio stripe or optical fiber) may be utilized. In this architecture, only the leader AP in each wire-connected cluster may have a wireless fronthaul link with the CPU.

Furthermore, the solutions described herein were evaluated using numerical simulations as presented with reference to working examples discussed herein. Based on the results included in the discussion of the working examples, it would be apparent to one of ordinary skill in the art that the high-frequency wireless fronthaul network in accordance with various embodiments of the present disclosure may provide sufficient data rates for the cell-free massive MIMO network by taking advantage of the larger bandwidth availability in the high-frequency band (e.g., mmWave or THz). For example, with the fully wireless architecture, it may be possible to achieve data rates with only 10-20% degradation compared to the fiber (wired) fronthaul based cell-free massive MIMO architectures. Further, the mixed-fronthaul architecture presented herein may reduce the bandwidth requirements and improve the data rates further. Based on the simulations presented in this document, the mixed-fronthaul architecture may enable data rates very similar to the fiber fronthaul based solutions with reasonable fronthaul bandwidth requirements.

As a brief aside, the following notations are used throughout this document: A is a matrix, a is a vector, a is a scalar, and $\mathcal{A}$ is a set. |A| is the determinant of A, whereas $A^T$, $A^H$, $A^*$, $A^{-1}$, $A^\dagger$ are its transpose, Hermitian (conjugate transpose), conjugate, inverse, and pseudo-inverse, respectively. $|\mathcal{A}|$ is the cardinality of $\mathcal{A}$. $\|a\|$ is the $l_2$ norm of a. I is the identity matrix. CN(m, R) is a complex Gaussian random vector with mean m and covariance R. $\mathbb{E}[\cdot]$ is used to denote expectation. $\mathbb{1}_{\{condition\}}$ is the indicator function of the condition given in the subscript.

In various embodiments, and with reference to FIG. 1, a system 100 including a cell-free massive MIMO network with a wireless fronthaul network is depicted. System 100 may include various computing devices, software modules, networks, and data structures in communication with one another. System 100 may also contemplate uses in association with web services, utility computing, pervasive and individualized computing, security and identity solutions, autonomous computing, cloud computing, commodity computing, mobility and wireless solutions, open source, biometrics, grid computing and/or mesh computing. System 100 may comprise a central processing unit (CPU) 102, a plurality of user equipment (UE) 104, and a plurality of groups 106 of access points (APs) 108 which may each include a high-frequency transceiver 110 and a low-frequency transceiver 112.

In various embodiments, with reference to FIG. 1, the CPU 102 including a plurality of antenna elements may communicate with M wireless APs 108 over a high-frequency (e.g., mmWave) wireless fronthaul network, and the wireless APs 108 may serve K UEs 104 over a low-frequency (e.g., sub-6 GHz) channel. For example, $\mathcal{M} = \{1, \ldots, M\}$ and $\mathcal{K} = \{1, \ldots, K\}$ to denote the sets of M APs 108 and K UEs 104. In the present disclosure, the downlink channel from the CPU 102 to the APs 108 is described as the fronthaul channel and the downlink channel from the APs 108 to the UEs 104 as the access channel. Further, at least some discussion of the various embodiments within the present disclosure may present the fronthaul channel as operating over a mmWave band, with a bandwidth $B^{fh}$, and the access channel as adopting a sub-6 GHz band, with a bandwidth $B^{ac}$. However, it would be apparent to one of ordinary skill in the art that the features and elements of the present disclosure may be applied to other dual-band architectures, such as for example a THz fronthaul channel with a mmWave access channel, without departing from the spirit and scope of the disclosure.

In various embodiments, to beamform a signal to the APs 108, the CPU 102 may employ an antenna array of N elements, while the APs 108 and UEs 104 may have single antennas (without being limited as such). With user-centric grouping (e.g., groups 106) of the APs 108, the message for UE K may be jointly transmitted by a subset of APs 108, where $\mathcal{G}_k \subseteq \mathcal{M}$. Regarding the working examples and descriptions presented herein, the set of the user-centric groups 106 may be denoted as $\mathcal{G} = \{\mathcal{G}_1, \ldots, \mathcal{G}_K\}$. Different groups 106 may include one or more of the same APs 108 since multiple APs 108 may be utilized in the transmission to each UE 104. For example, $U_m \subseteq \mathcal{M}$ may be defined for $m \in \mathcal{M}$ as the set of users that are being served by the AP m. For the distances between the CPU and m-th AP and between the m-th AP and the UE of the k-th user, $d_m^{fh}$ and $d_{mk}^{ac}$ may be used to denote them while no assumptions regarding any knowledge about the positions or distances between the CPU, APs, and/or UEs are made.

In various embodiments, at the fronthaul network, the CPU 102 may adopt a data transmission scheme, such as for example time-division multiple access (TDMA), to serve the K user-centric groups 106. In each TDMA slot, the CPU 102 may beamform a signal towards the APs 108 that serve a UE 104. Regarding the working examples discussed herein, the duration of the TDMA slot allocated for serving APs otf UE k may be denoted by $t_k$ with $h_m \in \mathbb{C}^N$ denoting the channel between the CPU and the m-th AP. With the message intended for user k being represented by $q_k^{fh} \in \mathbb{C}$, with $\mathbb{E}[|q_k^{fh}|^2]=1$, the received signal at the AP m may be written as $$y_m^{fh} = \sqrt{\rho^{fh}} h_m^H f_k q_k^{fh} + w_m^{fh}, \qquad (1)$$

where $\rho^{fh}$ is the normalized fronthaul transmission power and $u'_m{}^{fh} \sim CN(0, 1)$ is the receive noise at the m-th AP. The vector $f_k \in \mathbb{C}^N$ the CPU beamforming vector intended to focus the signal to the APs that serve user k.

Figure 3:
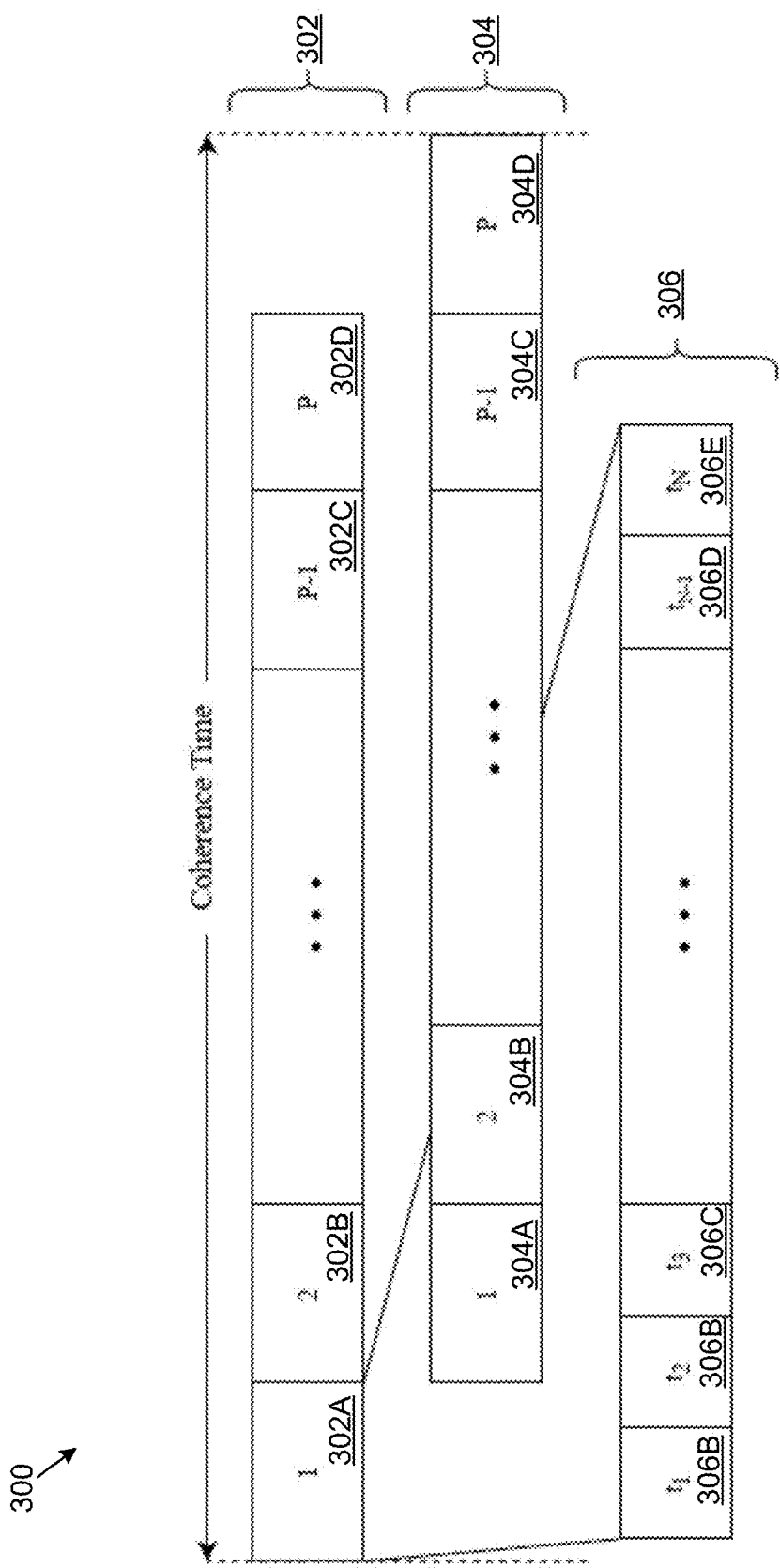
FIG. 3 is a diagram illustrating an example of data transmission scheduling performed within a cell-free massive MIMO system in accordance with various exemplary embodiments.

As a brief aside, with reference to FIG. 3 which is a diagram illustrating an example of data transmission scheduling performed within a cell-free massive MIMO system in accordance with various exemplary embodiments, the diagram in FIG. 3 illustrates a schedule for the transmissions through the access and fronthaul channels which facilitates simultaneous data transfer on both links. Although the fronthaul and access channel transmissions may be over different channels, the collaborative access channel may require the transmission data to be ready at the APs 108, which would necessitate the corresponding uplink transmissions to be completed. Hence, the transmissions should be scheduled in a manner so as to obtain high data rates. For example, to enable concurrent transmissions and effective utilization of the available bandwidth, the system 100 may adopt a schedule where the CPU 102 transmits small chunks (in, e.g., 302A-D) of the data at a time. After the first parts of the UE messages are received by the APs 108, the APs 108 may start to transmit the received parts of the UE messages (in, e.g., 304A-D) to the UEs 104. At the same time, the APs 108 may keep receiving the next portions of the data.

In FIG. 3, the transmission interval, defined by the coherence time of the access channel, is split into P small parts relating to a part of the UE messages being transmitted to the APs 108. After the first part (in, e.g., 302A) is transmitted to all the APs 108 over, e.g., the mmWave fronthaul network, the APs 108 may start transmitting that part (in, e.g., 304A) to the UEs 104 over, e.g., the sub-6 GHz access channel. Meanwhile, the APs 108 may receive the next part (in, e.g., 302B) of the UE messages. For, e.g., the TDMA adopted at the CPU 102, each of the P intervals allocated for the fronthaul network may be further split for transmissions to the groups 106 of APs 108. Specifically, the time allocated for the transmission from CPU 102 to the group of UE k may be denoted by $t_k$, as shown in the drawing (e.g., 306A-E).

In terms of the memory requirements, the APs 108 in a group 106 may need to keep the UE messages in their memory until the transmission. Since the coherence time is split into P parts, the communication rate of the system 100 may be multiplied by P/(P+1) due to the starting and ending times of the transmissions. To this end, if the end-to-end data rate of the system 100 is R and the coherence time is T, a memory of size m=RT/(P+1) may be needed at each AP 108. With respect to finding the data rate per transmission interval, at least the selection of appropriate P and T values may be taken into consideration.

Now referring back to FIG. 1, the CPU 102 in various embodiments may adopt an analog-only beamforming implemented by a network of quantized phase shifters to, e.g., satisfy practical mmWave hardware constraints. (As an aside, it would be apparent to one of ordinary skill in the art that the CPU 102 may also adopt a digital-only or a hybrid beamforming without departing from the spirit and scope of the disclosure.) This means that the beamforming vector $f_k$ can only be selected from a certain set of vectors, which may be defined by the codebook $\mathcal{F}$. If each phase shift has q bits, i.e., $2^q$ possible phase shift values defined by the set $$Q \in \{0, \frac{\pi}{2^q}, \frac{2\pi}{2^q}, \ldots, \frac{(2^q-1)\pi}{2^q}\},$$

then, the codebook $\mathcal{F}$ may be written as $$\mathcal{F} = \left\{\frac{1}{\sqrt{N}}[e^{j\phi_1}, \ldots, e^{j\phi_N}]^T : \phi_n \in Q, \forall n \in \{1, \ldots, N\}\right\} \quad (2)$$

and $f_k \in \mathcal{F}$

It may be assumed, with respect to working examples discussed herein, that the channels between the CPU 102 and APs 108 are available at the CPU 102 (motivated by the stationarity of the CPU 102 and the APs 108 and the channel reciprocity assumption).

Furthermore, in various embodiments, with reference to FIG. 1 as well as the working examples, at the access network, each AP 108 may receive and decode the CPU signal received by its high-frequency transceiver 110 (e.g., mmWave receiver) and prepare it for the transmission over the access channel (e.g., a sub-6 GHz channel). Each AP m may contribute in serving a set of users $U_m$ or UEs thereof, and the transmitted signal from the m-th AP, $x_m$, may be written as $$\lambda x_m = \sqrt{\rho^{sc}} \sum_{k \in U_m} \sqrt{p_{mk}} f_{mk}^{ac} q_k^{ac}, \quad (3)$$

where $\rho^{ac}$ is the shared APs coefficient for the transmit power coefficient of the APs, $f_{mk}^{ac}$ and $p_{mk}$ denote the beamforming and power control coefficients of the m-th AP for the k-th UE, and $q_k^{ac}$ represents the intended message for the k-th UE which satisfies $\mathbb{E}[|q_k^{ac}|^2]=1$. After all the APs 108 prepare their messages, the APs 108 may transmit the messages to their UEs 104. In various embodiments, all the APs 108 may maintain sufficient clock synchronization at, e.g., the sub-6 GHz access channel, which may be further facilitated by the adoption of, e.g., mmWave-based synchronization (with a mmWave-based fronthaul network). With $g_{mk}$ denoting the access channel coefficient between the m-th AP and k-th UE, the received signal at the UE k may be expressed as $$y_k^{ac} = \sum_{m=1}^{M} x_m g_{mk} + w_k, \quad (4)$$

where $w_k \sim CN(0, 1)$ is the receive noise at the UE k.

With an assumption (e.g., relating to working examples discussed herein) that the fronthaul link is operating over a mmWave band, and given the fixed-access deployment, a LOS channel between the CPU 102 and the APs 108 may be adopted in various embodiments. More specifically, the following may be considered $$h_m = \sqrt{N\beta_m^{fh}} \alpha_m^{fh} a(\theta_m), \quad (5)$$

where $\beta_m^{fh}$ represents the large-scale fading effects, $\alpha_m^{fh}$ the additional phase shift due to the LOS path, and $a(\cdot) \in \mathbb{C}^L$ is the array response vector function that takes the azimuth angle of departure from the CPU to AP m, denoted by $\theta_m$, as the input. For the access channel, the channel coefficient between AP m and UE k may be defined as $$g_{mk} = \sqrt{\beta_{mk}^{ac}} \alpha_{mk}^{ac}, \quad (6)$$

where $\beta_{mk}^{ac}$ and $\alpha_{mk}^{ac}$ represent the large- and small-scale fading coefficients. The small fading coefficients are taken as independent and identically distributed (i.i.d.) complex Gaussian random variables, i.e., $\alpha_{mk}^{ac} \sim CN(0, 1)$.

In a working example discussed herein, the optimization problem of the end-to-end achievable data rate of the wireless fronthaul based cell-free massive MIMO system in accordance with various embodiments may be formulated based on achievable rates of the access and fronthaul channels. In the following discussion, the superscripts denoting fronthaul and access channel variables are omitted as they can be easily distinguished by one of ordinary skill in the art from the context.

Based on the optimization regarding the end-to-end data rates as discussed herein including the assumptions (which are not intended to be limiting with respect to the present disclosure) made for solving the formulated problems relating to maximizing the data rates, the system discussed herein may adopt various algorithms, such as for example an iterative heuristic algorithms for appropriate grouping of APs 108 (related to maximizing data rates at the fronthaul network and the access network). Furthermore, additional optimization may be done with respect to the beamforming performed by the CPU 102 and the TDMA time fraction in order to enable the system 100 in accordance with various embodiments discussed herein to achieve the required high data rates.

Regarding the working examples discussed herein, the achievable rate of AP m, which is part of the k-th user group $\mathcal{G}_k$, may be written as $$R_m^{fh}(f_k) = \log(1 + p^{fh}|h_m^H f_k|^2), \quad (7)$$

where $f_k$ is the beamforming vector used by the CPU to serve the set of APs in the group $\mathcal{G}_k$. Noting that the message of the k-th UE is simultaneously transmitted to all the APs in $\mathcal{G}_k$, and that all the APs in the group should finish receiving the message before they start transmitting it to the user, the effective rate of group k may be defined as the minimum rate of the APs in $\mathcal{G}_k$'s group and written mathematically as $$R^{fh}(\mathcal{G}_k, f_k) = \min_{m \in \mathcal{G}_k} \{R_m^{fh}(f_k)\}. \tag{8}$$

Moreover, due to the TDMA schedule of the AP groups, the group rates may be further scaled by the TDMA time fractions. With $t_k$ denoting the fraction of TDMA time allocated to group $\mathcal{G}_k$, the time-scaled fronthaul data rate of group k may be written as $t_k R^{fh}(\mathcal{G}_k, f_k)$. It is noted that these time fractions satisfy the constraints $0 < t_k < 1$ and $\Sigma_{k=1}^K t_k = 1$.

With respect to the achievable data rate of the cell-free massive MIMO access channel, with reference to FIG. 1 and working examples discussed herein, the following assumptions may be made: (i) the APs 108 synchronously serve the UEs 104 without any cell boundaries, i.e., each AP 108 can serve any UE 104; (ii) time-division duplexing (TDD) is adopted for the transmissions, which facilitates the estimation of the downlink access channel coefficients through the uplink pilot transmissions; and (iii) only the large-scale fading coefficients are available at the CPU 102 for joint power allocation. Further, it may be assumed that the APs 108 adopt conjugate beamforming for the downlink transmission to the UEs 104. More specifically, the uplink pilot transmissions may be used to estimate the uplink channels (which may also be used to construct the downlink channels leveraging channel reciprocity). Then, the information about the large-scale fading coefficients may frequently be transmitted to the CPU 102. The CPU 102 can use this large-scale fading information to determine the access channel power coefficients. The APs 108 may adopt this power allocation while jointly serving their users.

In various embodiments, the UEs 104 may transmit orthogonal pilot sequences of length $L_p$, $\psi_1, \ldots, \psi_K \in \mathbb{C}^{L_v}$, simultaneously to be received by all the APs 108. If $p_t$ denotes the power level selected for the pilot transmissions, the received signal at AP m may be written as $$y_m^t = \sqrt{\rho_t L_p} \sum_{k=1}^K g_{mk} \psi_k + n_m, \tag{9}$$

where $n_m \sim CN(0, I_L)$ the receive noise. With us received signal, MMSE (minimum mean square error) estimator for may be given by $$\hat{g}_{mk} = \frac{\sqrt{\rho_t L_p \beta_{mk}}}{1 + \rho_t L_p \beta_{mk}} \psi_k^H y_m^t. \tag{10}$$

The channel estimation error may be defined as $\tilde{g}_{mk} = g_{mk} - \hat{g}_{mk}$, with a note that the estimation $\hat{g}_{mk}$ and the error $\tilde{g}_{mk}$ are uncorrelated. Thus, the distributions of the estimated channel coefficients and the error may be written as $$\hat{g}_{mk} \sim CN(0, \hat{\beta}_{mk}), \tilde{g}_{mk} \sim CN(0, \beta_{mk} - \hat{\beta}_{mk}), \tag{11}$$

with the variance of the estimator being defined as $$\hat{\beta}_{mk} = \frac{\rho_t L_p \beta_{mk}^2}{1 + \rho_t L_p \beta_{mk}}. \tag{12}$$

With conjugate beamforming, the coefficients $f_{mn}^{ac}$ in the received signal equations (3)-(4) may be replaced by $\hat{g}^*_{mn}$. Further, with the changes on the signal model described herein, the capacity lower bound for the UEs given in equation (8) becomes valid, and the achievable data rate of UE k may be expressed as $$R_k^{ac} = \log_2 \left( 1 + \frac{\rho^{ac} \left( \sum_{m=1}^M \sqrt{p_{mk}} \hat{\beta}_{mk} \right)^2}{\rho^{ac} \sum_{m=1}^M \beta_{mk} \sum_{k'=1}^K p_{mk'} \hat{\beta}_{mk'} + 1} \right), \tag{13}$$

where it is noted that the power coefficient $p_{mk}$ for the AP m and UE k is set to 0 if the AP is not in the group of that UE, i.e., if $m \notin \mathcal{G}_k$. These power coefficients for each AP m also satisfy $$\sum_{k=1}^K p_{mk} \hat{\beta}_{mk} \le 1, \forall m \in \mathcal{M}, \tag{14}$$

which captures the total power constraint of AP m.

Based on the achievable data rates for the fronthaul and access channels discussed with reference to the working examples discussed herein, the end-to-end achievable data rate of the system 100 may now be derived. Based on the adopted system model of the system 100, the end-to-end achievable data rate for UE k may be defined as the minimum of the fronthaul and the access channel rates, which can be expressed as $$R_k = \min \{B^{ac} R_k^{ac}, t_k B^{fh} R_k^{fh}(f_k)\} \tag{15}$$

where the end-to-end channel rate accounts for the fronthaul and access bandwidths (noting that the fronthaul bandwidth in, e.g., the mmWave-based fronthaul is expected to be much larger than the bandwidth of, e.g., the sub-6 GHz access channel). To optimize the end-to-end data rate, the following formulation of the joint max-min fair rate optimization problem may be adopted $$\max_{\mathcal{G},\{f_k\},\{t_k\},\{p_{mk}\}} \min_k R_k \tag{16a}$$

$$\text{s.t.} \sum_{k \in \mathcal{K}} p_{mk} \hat{\beta}_{mk} \le 1, \forall m \in \mathcal{M} \tag{16b}$$

$$p_{mk} = 0, \forall m \notin \mathcal{G}_k, \forall k \in \mathcal{K} \tag{16c}$$

$$0 < t_k < 1, \forall k \in \mathcal{K} \tag{16d}$$

$$\sum_{k \in \mathcal{K}} t_k = 1 \tag{16e}$$

$$f_k \in \mathcal{F}, \forall k \in \mathcal{K} \tag{16f}$$

which aims to jointly optimize the AP groups, the fronthaul beamforming vectors, the fronthaul time allocation for different groups, and the access channel power coefficients. The problem is non-convex and challenging, especially due to the AP grouping and the fronthaul analog-only beamforming. It is noted that the AP grouping and analog beamforming can be optimally designed via an exhaustive search over all the possible groups and candidate beam codewords, but this will require prohibitive complexity. To reduce this complexity, an iterative solution may be utilized.

The optimization problem in equation (16) can be written in the equivalent form as follows $$\max_{\mathcal{G},\{f_k\},\{p_{mk}\},\{t_k\}} \min\{B^{ac}R_k^{ac}, t_k B^{fh} R_k^{fh}(f_k)\}_{k=1}^K \quad (17)$$

s.t. (16b) – (16f)

where the objective is to maximize the minimum of all the fronthaul and access channel data rates.

For the given system model and the max-min fairness problem defined in equation (17), the separate optimization of the access channel and fronthaul variables may depend on the group variable $\mathcal{G}$. Nevertheless, for a fixed grouping $\mathcal{G}$, only the objective function (but not the constraints) retains the variables of both the fronthaul ($f_k$ and $t_k$) and access channel ($p_{mk}$), i.e., each constraint affects either the fronthaul channel or the access channel. Therefore, for a given grouping, a two-step approach may be developed with the access channel and fronthaul optimization steps to obtain an optimal solution.

Thus, with a given grouping structure considered, with reference to working examples discussed herein, two separate problems that maximize the fronthaul and access channel data rates were designed: (i) the access channel power coefficients were optimized without any consideration of the fronthaul channel, and (ii) the beamforming vectors for each group and TDMA time fractions were determined to maximize the fronthaul data rate in a fair manner. As this process may be conditioned on the grouping structure, an optimization of this grouping may be required in order to maximize the end-to-end data rates. For that, an iterative heuristic algorithm for the AP grouping where each iteration involves solving two sub-problems for the fronthaul and access data rates may be utilized.

For a given AP grouping selection, the power coefficients for the access channel may first be optimized, without any fronthaul channel limitations. This approach allows an allocation of the power of the APs 108 over the access channel in a similar way to the standard approaches in the cell-free massive MIMO literature known to those with ordinary skill in the art. To formulate the access channel optimization problem with reference the working examples discussed herein, only the access channel related terms and constraints of the original problem defined in (17) were kept, and the following was written $$\max_{\{p_{mk}\}} \min_k B^{ac} R_k^{ac} \quad (18a)$$

$$\text{s.t.} \sum_{k \in \mathcal{K}} p_{mk} \hat{\beta}_{mk} \le 1, \forall m \in \mathcal{M} \quad (18b)$$

$$p_{mk} = 0, \forall m \notin \mathcal{G}_k, \forall k \in \mathcal{K}, \quad (18c)$$

where two further simplifications can be applied to the objective. First, since $B^{ac}$ is a positive constant multiplied with a function of the variables, it can be removed. Second, the objective can be re-written in terms of the SINR (signal-to-interference-plus-noise ratio) values, instead of the rates of the form log (1+SINR). This re-formulation does not change the optimal power coefficients, since log (1+SINR) is a non-decreasing function of the SINR values. Thus, the equation (18) may be simplified, and the grouping sensitive max-min SINR optimization for the access channel may be written as $$\max_{\{p_{mk}\}} \min_k \text{SINR}_k = \frac{p_d \left(\sum_{m=1}^M \sqrt{p_{mk}} \hat{\beta}_{mk}\right)^2}{1 + p_d \sum_{m=1}^M \beta_{mk} \sum_{k'=1}^K p_{mk'} \hat{\beta}_{mk'}} \quad (19a)$$

$$\text{s.t.} \sum_{k=1}^K p_{mk} \beta_{mk} \le 1, \forall m \in \mathcal{M} \quad (19b)$$

$$p_{mk} = 0, \forall m \notin \mathcal{G}_k, \forall k \in \mathcal{K}, \quad (19c)$$

When all the APs 108 transmit to all UEs 104, i.e., $\mathcal{G}_k = \mathcal{M} \ \forall k \in \mathcal{K}$, the equation (19c) does not provide any constraints, and the presented optimization of the access channel becomes directly equivalent to the power allocation of cell-free massive MIMO. For the solution of the equation (19), the additional grouping constraint (19c), which would allow an AP 108 to transmit only to the UEs 104 whose groups 106 include that AP by restricting the power allocated for the other UEs to 0, may be considered. It is a linear equality constraint which does not affect the convexity of the problem. Hence, for the problem (19), a similar solution to the optimal power-allocation of the standard cell-free massive MIMO may be applied. Specifically, as the SINR functions are quasi-concave, the problem can be reformulated with convex constraints by introducing a variable $\gamma$, as follows $$\max_{\{p_{mk}\},\gamma} \gamma \quad (20a)$$

$$\text{s.t. SINR}_k \ge \gamma, \forall k \in \mathcal{K} \quad (20b)$$

$$\sum_{k=1}^K p_{mk} \hat{\beta}_{mk} \le 1, \forall m \in \mathcal{M} \quad (20c)$$

$$p_{mk} = 0, \forall m \notin \mathcal{G}_k, \forall k \in \mathcal{K}. \quad (20d)$$

This formulation can be optimally solved by a bisection method known in the art, which iterates over $\gamma$ values. For a selected $\gamma$ value, the SINR constraints in equation (20b) can be cast as second-order cone constraints, and the equation (20) becomes a feasibility problem that aims to find a set of power coefficients satisfying the constraints. This feasibility problem can be solved by the convex solvers known in the art as a second-order cone problem (SOCP). For the bisection method, an interval containing the optimal minimum SINR value $\gamma^* \in [\gamma_{min}, \gamma_{max}]$ may be determined. Then, the middle point of the interval $$\gamma = \frac{\gamma_{max} + \gamma_{min}}{2}$$

is selected for the feasibility problem. If the solution of the problem is feasible, i.e., there exists a power allocation solution providing the constraints, the lower limit of the interval is updated with the middle point of the interval ($\gamma_{min} = \gamma$). Otherwise, the upper limit of the interval may be updated with the same value ($\gamma_{max} = \gamma$). The iterations described herein may be applied until the interval is smaller than a pre-determined convergence distance.

Then, an optimization problem to maximize the fronthaul data rates of the distributed AP groups 18 in a fair manner may be defined. First, by starting with the original formulation given in equation (17), a max-min fair fronthaul optimization problem may be written by eliminating the access channel related constraints and objectives, as follows $$\max_{\{t_k\}\{f_k\}} \min_k t_k R^{fh}(\mathcal{G}_k, f_k) \quad (21a)$$

$$\sum_{k \in \mathcal{K}} t_k = 1 \quad (21b)$$

$$t_k \geq 0, \forall k \in \mathcal{K} \quad (21c)$$

$$f_k \in \mathcal{F}, \forall k \in \mathcal{K}. \quad (21d)$$

For this problem in equation (21), and given the group selections $\{\mathcal{G}_k\}$, the optimal solution may be obtained by first optimizing the data rates for all the groups, $R^{fh}(\mathcal{G}_k, f_k) \forall k$, and then optimizing the TDMA time allocation. This is because any set of TDMA time fractions, $\{t_k\}$, does not affect the optimization of the beamforming vectors.

The beamforming vector of each group 106 needs to be optimized to maximize the group data rate. Since this rate may be determined by the minimum rate of the APs 108 in the group 106, the beamforming optimization problem of any $\mathcal{G}_k$ may be formulated as follows $$f_k^* = \operatorname*{argmax}_{f_k} \left( R^{fh}(\mathcal{G}_k, f_k) = \min_{m \in \mathcal{G}_k} \{R_m^{fh}(f_k)\} \right) \quad (22)$$
$$\text{s.t. } f_k \in \mathcal{F},$$

which coincides with the multicast beamforming problem with analog phase-shifters as well-studied in the art. The optimal solution to the problem can be obtained by exhaustive search which has the complexity increasing exponentially with number of antennas, i.e., $\mathcal{O}(|\mathcal{Q}|^N) = \mathcal{O}(2^{qN})$. To reduce this complexity, several methods have been developed in the literature known to one of ordinary skill in the art. In the simulation results discussed herein, one of these methods was utilized based on its low complexity and good performance. With the optimized beamforming vectors, the optimal time fractions of the TDMA may be determined. Two approaches to solve this TDMA time fraction optimization problem follow.

TDMA Optimization—Approach 1

Given the solution of the problem (22), $\{f_k^*\}$, the fronthaul rate of each group k becomes a constant denoted by $R^{fh}(\mathcal{G}_k) = R^{fh}(\mathcal{G}_k, f_k^*)$. With these rate constants, the fronthaul data rate maximization problem given in equation (21) can be simplified to $$\max_{\{t_k\}} \min_k t_k R^{fh}(\mathcal{G}_k) \text{ s.t. } \sum_{k \in \mathcal{K}} t_k = 1, t_k \geq 0, \forall k \in \mathcal{K}, \quad (23)$$

where the solution can be obtained by, a slack variable, $\eta$, and the equivalent formulation being as follows $$\max_{\{t_k\}, \eta} \eta \text{ s.t. } \eta \leq t_k R^{fh}(\mathcal{G}_k) \forall k \in \mathcal{K}, \sum_{k \in \mathcal{K}} t_k = 1, t_k \geq 0 \forall k \in \mathcal{K}. \quad (24)$$

This formulation is a linear program and the solution can be attained by finding the maximum $\eta$, equivalent to the time-scaled data rate of each user, i.e., $\eta = t_k R^{fh}(\mathcal{G}_k)$. That is, $$t_k = \frac{\eta}{R^{fh}(\mathcal{G}_k)}.$$

By the equality constraint $\Sigma_{k=1}^K t_k = 1$, the solution for the sum fronthaul data rate, $R^{fh}(\mathcal{G}) = K\eta$, may be written by $$R^{fh}(\mathcal{G}) = \frac{K}{\sum_{k=1}^K (R^{fh}(\mathcal{G}_k))^{-1}} = HM\{R^{fh}(\mathcal{G}_k)\} \quad (25)$$

where $HM\{\cdot\}$ denotes the harmonic mean function.

Between the obtained access channel and fronthaul data rates, the minimum of these may, be considered to provide an efficient solution to equation (17) for a given grouping structure.

The foregoing solution aims to maximize the minimum of the data rates, which is the objective of the equation (17). Further to this solution, the data rates of the other groups may still be able to be increased without decreasing the minimum of the end-to-end rates of the given groups, by further optimizing the fronthaul TDMA time allocations of these groups. The solution given in equation (25) attempts to maximize the minimum of the fronthaul group data rates without accounting for the optimized access channel data rates. The user data rates, however, depend on both the access and fronthaul data rates. Therefore, the data rates of the users may further be increased by taking into account the access data rates as a restricting constraint. Based on this, the following problem which attempts to optimize the fronthaul data rate of each group to meet the access data rate of the group in a fair manner may be considered.

TDMA Optimization—Approach 2

For a fair allocation, the time-scaled data rate of the groups 106 should be equal, unless any of the constraints are met. Thus, the time allocated to each group 106 should be inversely proportional to their data rates. To achieve this, with reference to working examples discussed herein, a weighted logarithm function for the objective, i.e., $\Sigma_k w_k \log(t_k)$, which allows the resources to be allocated fairly, proportional to the weights, $w_k$, may be utilized. The weights may be selected as $$w_k = \frac{1}{R^{fh}(\mathcal{G}_k)},$$

to allocate the time fractions inversely proportional to the fronthaul data rates of the groups, resulting in equal fronthaul data rates. In addition, an upper-bound may be placed for the fronthaul data rate of a user by the access channel data rate of that user. With this upper-bound, the total time fractions do not necessarily meet the summation equality, $\Sigma_{k \in \mathcal{K}} t_k = 1$. Thus, the condition may be relaxed by $\Sigma_{k \in \mathcal{K}} t_k \leq 1$, and the problem for the time allocation of the TDMA, which maximizes the end-to-end data rate in a fair manner, may be written as follows $$\max_{\{t_k\}} \sum_{k \in \mathcal{K}} \frac{1}{R^{fh}(\mathcal{G}_k)} \log t_k \quad (26a)$$

-continued $$\sum_{k \in \mathcal{K}} t_k \leq 1 \quad (26b)$$

$$t_k \leq \frac{B^{ac} R_k^{ac}}{B^{fh} R^{fh}(\mathcal{G}_k)}, \forall k \in \mathcal{K} \quad (26c)$$

$$t_k \geq 0, \forall k \in \mathcal{K} \quad (26d)$$

where the problem is concave, and the solution can be derived with Krush-Kuhn-Tucker conditions. The resulting solution may take a similar form with the water-filling solution with upper-bounds. Specifically, the solution can be obtained by finding the maximum individual fronthaul data rate (water level), η>0, that satisfies the following inequality $$\sum_{k \in \mathcal{K}} t_k^*(\eta) \leq 1 \quad (27)$$

where $$t_k^*(\eta) = \min\left\{\frac{B^{ac} R_k^{ac}}{B^{fh} R^{fh}(\mathcal{G}_k)}, \frac{\eta}{R^{fh}(\mathcal{G}_k)}\right\}. \quad (28)$$

For the optimal η value, η*, the optimal time fractions $t^*_k = t^*_k(\eta^*)$ may be obtained. The given solution allocates the fronthaul data rates equally among UEs, until the satisfaction of individual access channel data rates or the use of the total time is achieved. In the special case of all the fronthaul data rates being smaller than the access channel data rates, it can allocate the data rates equally, coinciding with equation (25).

With the foregoing fixed-group end-to-end data rate maximization, the efficient selection of the groups 106 can become crucial in achieving high data rates. However, the group selection problem is a combinatorial problem that has high complexity given the large number of APs 108 and UEs 104. In particular, there are $2^M$ possible selection of groups 106 for each UE 104, leading to a total of $2^{MK}$ distinct selections for the K users. Moreover, each selection of the groups 106 needs to be utilized with the foregoing end-to-end data rate optimization which results in prohibitive optimization complexity for practical systems. Hence, an efficient design for the group selection is required. To this end, a low-complexity yet efficient solution that is motivated by understanding of the end-to-end achievable data rate optimization problem and the cell-free massive MIMO architecture in accordance with various embodiments of this disclosure may be considered.

The following group selection approach may be considered. The group of each user may be selected as the G APs with the maximum channel gains. Here, (i) the group size G is assumed to be fixed for the sake of simplicity and low-complexity solution (noting that the impact of this constraint is expected to be marginal given the high density of the APs); and (ii) the selection of the APs with the maximum channel gains may lead to a set of APs that are close to one other, which may lead to efficient beamforming design via more focused beams. With $\{\beta_{1k}^{(o)}, \ldots, \beta_{Mk}^{(o)}\}$ defining the ordered set of channel coefficients between user k and the M APs, this set may adopt a descending order, i.e., the channel coefficients satisfy $\beta_{mk}^{(o)} \geq \beta_{m'k}^{(o)}$ for any m<m'. In addition, to formalize the mapping between the original channel coefficients set $\{\beta_{1k}, \ldots, \beta_{Mk}\}$ and the ordered channel coefficients set $\{\beta_{1k}^{(o)}, \ldots, \beta_{Mk}^{(o)}\}$, the permutation ζk(.) may be defined such that $\beta_{m'k}^{(o)} = \beta_{mk}$ if ζk(m')=m, i.e., if the m-th AP has the m'-th highest channel gain. Using these definitions, for a given group size G, the group of UE k can be determined as $$\mathcal{G}_k = \bigcup_{m'=1}^{G} \zeta k(m') \quad (29)$$

which simply selects the G APs with the best channel gains. With this approach, the group selection may be reduced to the selection of the parameter G.

The number of APs 108 per group 106, G, may be optimized to maximize the end-to-end data rate. It is noted that a small group size may lead to more optimized CPU-APs beamforming design and thus high fronthaul data rates. At the same time, it may result in lower APs-user beamforming design and thus lower achievable access channel data rates. Thus, to select G, one approach may include trial of different group size values frons a pre-determined interval (for a given AP structure). Another approach may be to start from a certain group size G and then increase/decrease the group size depending on the relation between the access and fronthaul data rates. More specifically, if the sum fronthaul data rate is larger than the sum access channel data rate, i.e., $R^{fh} \geq R^{acc}$, the group size may be increased. Otherwise, if $R^{fh} < R^{acc}$, the group size may be decreased. Through the iterations of these updates, the group value may be locally optimized (achieving some fairness between the users even though the iterative algorithm is applied through the sum data rates, since the group size is fixed).

In order for the system 100 to achieve the required high data rates, an efficient design for the group selection may be required. To this end, the following process may be adopted. First, the group 106 selected for each UE 104 may include APs 108 with the maximum channel gains. In one example, such a way of the group selection may involve groups 106 of a fixed size and APs 108 that are close. Furthermore, the CPU 102 may adopt a trial of various group size values based on pre-determined time intervals, and/or start from a predetermined group size (e.g., as defined by the network operator or user) and increase or decrease the group size depending on the relationship between the access and fronthaul data rates. It may be noted that, e.g., a small group size may lead to more optimized CPU-APs beamforming design and thus high fronthaul data rates.

Figure 2:
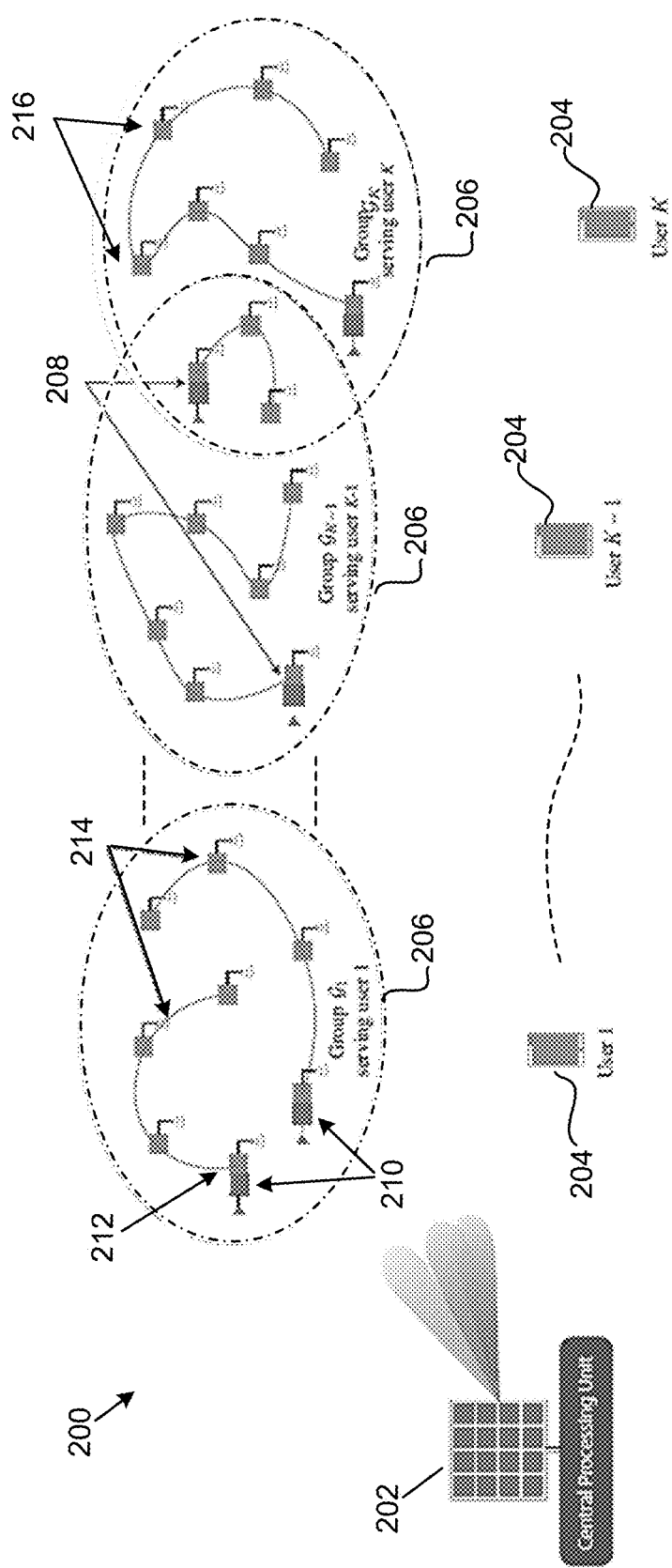
FIG. 2 is another diagram illustrating components of another cell-free massive MIMO system in accordance with various exemplary embodiments.

Now referring to FIG. 2, another diagram is presented for illustrating components of another cell-free massive MIMO system architecture in accordance with various exemplary embodiments—specifically those with a mixed-fronthaul cell-free MIMO architecture. System 200 may include a CPU 202, a plurality of UEs 204, various groups 206 including leader APs 208 and low-frequency band APs 216 serving the UEs 204. The leader APs 208 and low-frequency band APs 216 may be organized as clusters 214. Each cluster 214 may include one (1) leader AP 208 connected to a plurality of low-frequency band APs 216 by wire (e.g., a radio stripe or optical fiber). A leader AP 208 may be wirelessly connected to the CPU 202 and include a high-frequency transceiver 210 for data communication with the CPU 202 and a low-frequency transceiver 212 for serving the UEs 204. The low-frequency band APs 216 may only include low-frequency transceivers 212 since they may be connected via wire to the leader APs 208 while serving the UEs 204 wirelessly.

To reduce the cost of the distributed APs 208 and/or 216 while maintaining the deployment/operational advantages of using the wireless fronthaul network, the foregoing alternative architecture may be utilized. In the system 200, the leading AP 208 may have a wireless-fronthaul connection to the CPU 202. This leading AP 208 may be responsible for transmitting/receiving the cluster data to/from the CPU 202. The connection between the APs 208 and/or 216 in each cluster 214 may be realized using, e.g., radio stripes. With such implementation, the mixed-fronthaul cell-free massive MIMO architectures may combine the advantages of the radio stripes and the installation cost/flexibility improvements of the higher-band wireless fronthaul network.

From an operation perspective, the foregoing mixed-fronthaul architecture may reduce the number of APs 208 and/or 216 that may be simultaneously using the wireless fronthaul channel, which may relax the fronthaul network requirements in terms of the equipment cost, the required bandwidth, and the beamforming design. Therefore, this mixed-fronthaul architecture may achieve high wireless fronthaul data rates since better beams may be utilized by the CPU 202 in serving the leading APs 208 of the clusters 214. In various embodiments, all the APs 208 and/or 216 in one cluster 214 may serve the same UE 204. In other embodiments, for example where the number of APs 208 and/or 216 in each cluster 214 is relatively large, the system 200 may relax this constraint, e.g., to allow any user to be served by only a subset of the cluster APs.

With reference to FIG. 2, the rate optimization solution discussed with respect to the system 100 of FIG. 1 may be extend to the system 200 of FIG. 2. For example, all the APs in the system 200 may be assumed to be in one cluster for serving the same set of UEs. This is motivated by the negligible data transmission cost. within the same cluster. Further, the following may be assumed: L distinct AP clusters, such that $C_l \subseteq \mathcal{M}$, $\forall l \in \{1, \ldots, L\}$ with $\cup_{l=1}^{L} C_l = \mathcal{M}$ and $C_l \cap C_{l'} = \emptyset$, $\forall l \neq l'$. Then, the APs group of user k, which may be denoted as $\mathcal{G}_k^{cluster}$ (emphasizing selection from the available AP clusters will satisfy $\mathcal{G}_k^{cluster} \subseteq \{1, \ldots, L\}$. Further, $a_l$ may represent the leading AP of the l-th cluster.

With the system architecture of the system 200 in FIG. 2, the CPU only needs to transmit the data to the leadings APs of the clusters of the k-th UE. The user-centric fronthaul groups of the leading APs of the clusters may be defined as $\mathcal{G}_k^{fh} = \{a_l : l \in \mathcal{G}_k^{cluster}\}$. This notation allows a straightforward use of the fronthaul formulation in equation (21), only by adopting $\mathcal{G}_k^{fh}$ instead of $\mathcal{G}_k$, the rest of the fronthaul optimization methodology discussed herein can be carried out in the same form.

Similar to the fronthaul, $\mathcal{G}_k^{ac}$ may be used to denote the set of APs serving each user k over the access channel. This may be described as $\mathcal{G}_k^{ac} = \{C_l : l \in \mathcal{G}_k^{cluster}\}$. With this notation, the original access channel formulation in equation (18) may be utilized and the adopted rate optimization approach, by replacing the AP groups $\{\mathcal{G}_k\}$ with the access channel groups $\{\mathcal{G}_k^{ac}\}$. For the selection of the groups, as the user groups are defined in terms of the clusters, a metric for each cluster may be needed. For this purpose, the sum of the channel gains of the APs may be considered, i.e., $\bar{\beta}_{lk} = \Sigma_{m \in C_l} \beta_{mk}$, and the G clusters with the maximum value as the clusters of a UE, $\mathcal{G}_k^{cluster}$. After determination of the active clusters of UEs, the obtained groups of clusters may be converted to the fronthaul and access channel groups of the APs by the definitions presented herein. Then, the access channel and fronthaul optimization problems can be utilized over the access channel and fronthaul groups, completing an iteration of end-to-end data rate maximization.

Figure 4:
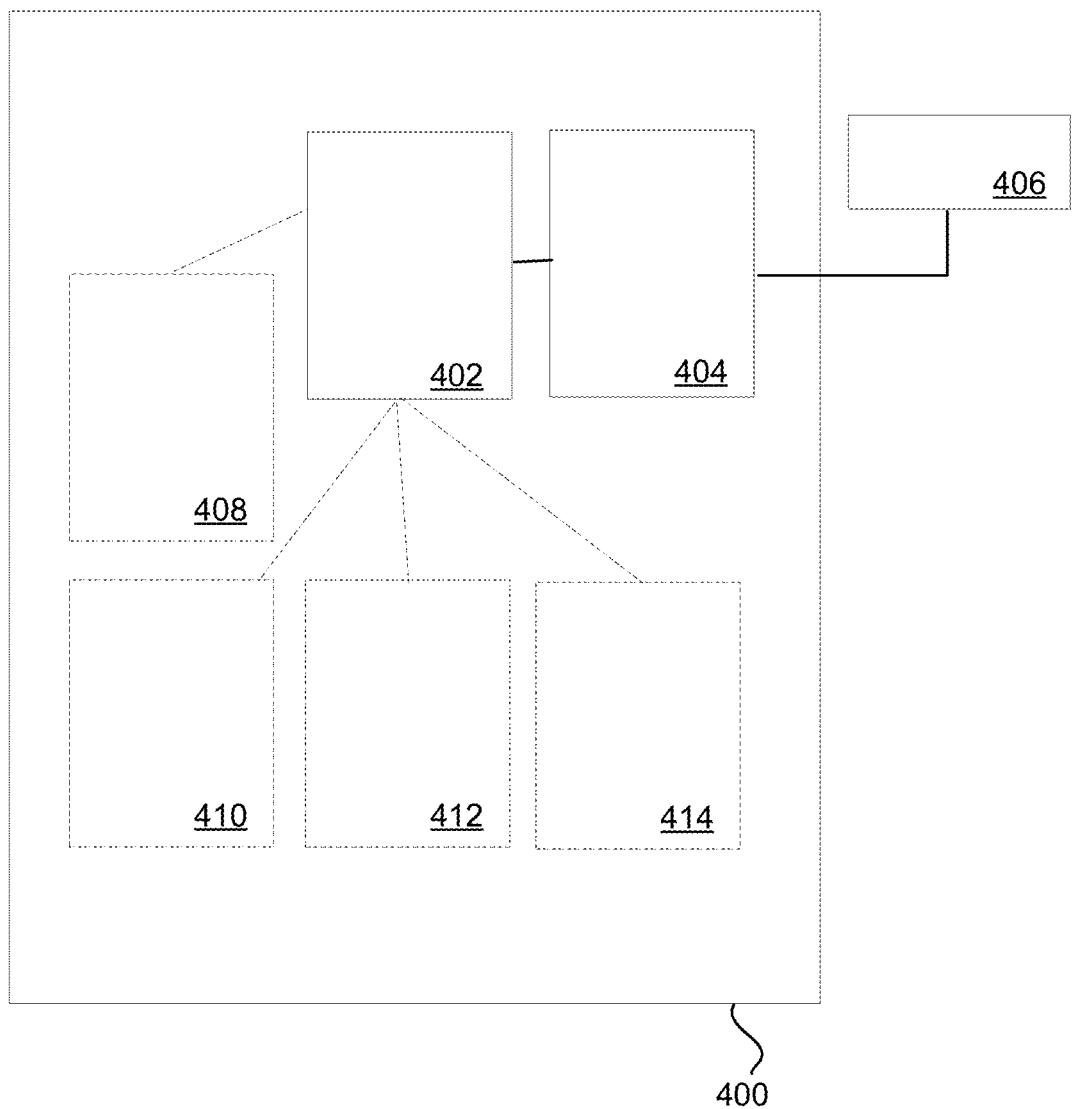
FIG. 4 is a block diagram illustrating components of a central processing unit (CPU) within a cell-free massive MIMO system in accordance with various exemplary embodiments.

FIG. 4 is a block diagram illustrating components of a CPU 400 within a cell-free massive MIMO system in accordance with various exemplary embodiments. The CPU 400 may include a processor 402 coupled with a transceiver (e.g., a high-frequency band transceiver such as a mmWave or THz transceiver) 404 connected to an antenna 406 including a plurality of antenna elements (not shown). Furthermore, depending on the mode of directional transmission of data (e.g., via beamforming, such as for example analog, digital, or hybrid beamforming), the CPU 400 may further include an amplifier 408, a phase shifter 410, an analog-to-digital converter 412, and/or a memory 414. For example, the digital beamforming may entail that each signal pass through the analog-to-digital converter 412 to create a digital data stream. Then, the digital data stream may be added up digitally (e.g., using the memory 414) with other digital data streams, for example with appropriate scale-factors and/or phase-shifts, to get the composite signals. On the other hand, the analog-beamforming may entail taking a plurality of the analog signals, scaling and/or phase-shifting them using analog methods (e.g., using the amplifier 408 and/or the phase shifter 410), summing them, and then digitizing a single output data stream.

Figure 5:
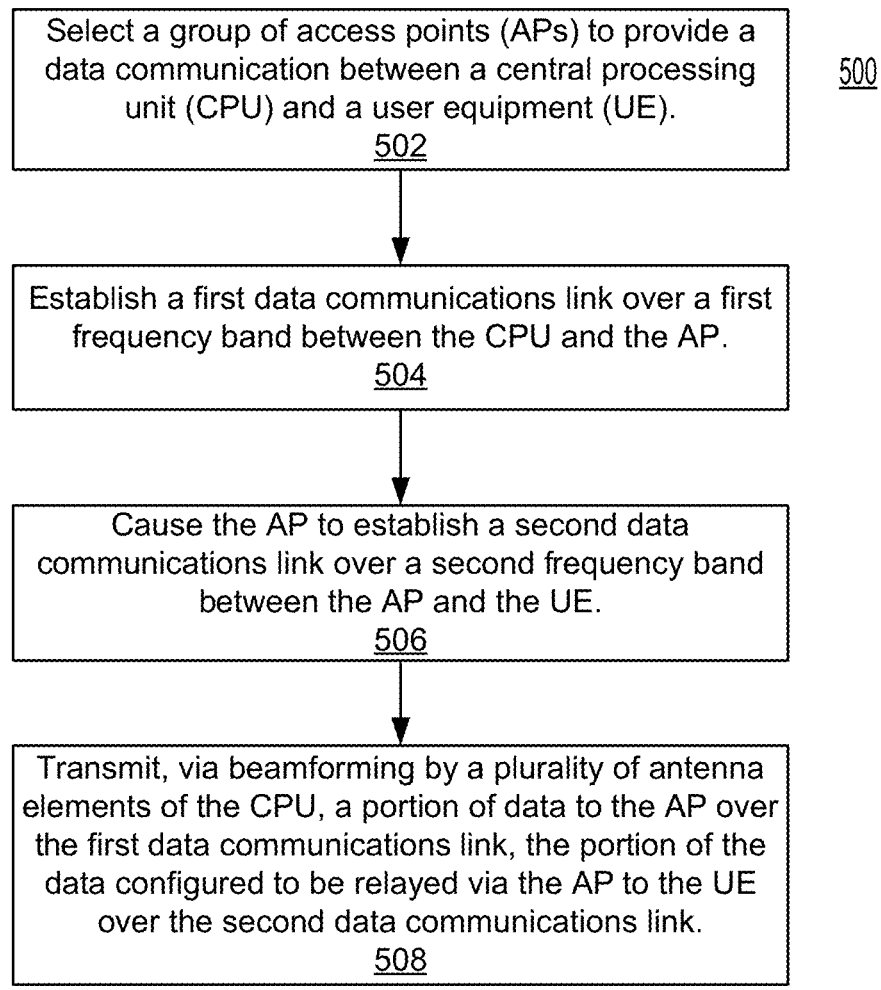
FIG. 5 is a process performed by a CPU within a cell-free massive MIMO system in accordance with various exemplary embodiments.

FIG. 5 is a process performed by a CPU within a cell-free massive MIMO system in accordance with various exemplary embodiments.

As described herein, a CPU may select a group of APs to provide a data communication between the CPU and a UE (step 502). The selection may be based on a network operator input, user input, previous grouping utilized for providing data communication for the UE, or based on the foregoing discussion relating to maximizing the end-to-end data rates for systems 100 or 200 as presented herein.

Then, referring to step 504, the CPU may establish a first data communications link over a first frequency band between the CPU and the APs. As described herein, the first data communications link may be a wireless link, and the first frequency band may be a high-frequency band, such as for example a mmWave band or a THz band. The link between the CPU and the APs may include the wireless fronthaul channel described herein.

Then, referring to step 506, the CPU may cause the AP to establish a second data communications link over a second frequency band between the AP and a UE. As described herein, the second data communications link may be a wireless link, and the second frequency band may be a frequency band including frequency levels lower than those of the first frequency band—e.g., a sub-6 GHz band or a mmWave band (e.g., if the first frequency band is a THz band). The link between the AP and the UE may include the access channel described herein.

Then, in step 508, the CPU may transmit, via beamforming by a plurality of antenna elements of the CPU, a portion of data to the AP over the first data communications link (e.g., a wireless fronthaul channel), and the portion of the data may be relayed to the UE by the AP over the second data communications link (e.g., an access channel). The data transmitted via various APs as described herein may be scheduled according to a scheduling scheme as described herein (e.g., using TDMA).

Working Example

A computer simulation was run to evaluate the performance of the system architecture in accordance with various embodiments of the present disclosure. In the simulation, both the system architecture with separate APs (see, e.g., FIG. 1) and the system architecture with connected APs (see, e.g., FIG. 2) were considered. For both architectures, mmWave fronthaul channels at $f^{fh}$=28 GHz carrier frequency, access channels at $f^{ac}$=3.5 GHz carrier frequency, the bandwidth allocated for the access channels being $B^{ac}$=20 MHz, and various values for the fronthaul bandwidth were considered. The noise figure was set to 9 dB for both the fronthaul and the access links. The CPU was deploying a uniform linear array with N=128 elements and half wavelength antenna spacing. The transmit power of the CPU was assumed to be $\tilde{\rho}^{fg}$=30 dBm for the fronthaul links while the APs and users transmit powers were set to $\tilde{\rho}^{ac}=\tilde{\rho}^L$ 10 dBm for the access links and pilot transmissions. The noise power was determined based on the bandwidth of the fronthaul and access channels, following $\sigma_n^2 = \sigma^2 \cdot B \cdot k \cdot T$, with the Boltzmann constant k, the channel bandwidth B, the temperature T=290 K, and the noise figure $\sigma^2$. The normalized power levels of the different power levels were then determined by $$\rho = \frac{\tilde{\rho}}{\sigma_n^2}$$

with the corresponding parameters of the specific channel. These baseline system parameters are summarized in Table 1 below. The values that are selected differently from the baseline parameters in different figures are explicitly stated.

TABLE 1

| Parameter | Fronthaul | Access Channel |
| --- | --- | --- |
| Frequency ($f_c^{th}$, $f_c^{ac}$) | 28 GHz | 3.5 GHz |
| Bandwidth (B) | 2 GHz | 20 MHz |
| Power ($\tilde{\rho}^{fh}$, $\tilde{\rho}^{ac}$) | 30 dBm | 10 dBm |
| Noise Figure ($\sigma^2$) | | 9 dB |
| Antenna Spacing ($d_A$) | $\lambda/2$ | N/A |
| CPU Antennas (N) | | 128 |

For the large scale channel coefficients, the 3GPP Urban Micro (UMi) street-canyon model was adopted as follows:

$PL(d, f_c)$=32.4($dB$)+20 $\log_{10} d(m)$+21 $\log_{10} f_c(GHz)$ ($dB$).

Specifically, the mmWave fronthaul and sub-6 Ghz access channel large scale coefficients may be written in terms of the path-loss function as $\beta_m^{ac}$=PL($d_m^{fh}$, $f_c^{fh}$), $\beta_{mk}^{ac}$=PL($d_{mk}^{ac}$, $f_c^{ac}$).

The phase-shift of the fronthaul were taken as $\alpha_m^{fh}$=1 while the small-scaling fading of the access channel were generated by $\alpha_{mk}^{ac}$~CN(0, 1). For the phase-shift set of analog beamforming at the CPU, q=3 bit quantizers were used, uniformly sampling the angle space.

With respect to the system architecture of the system 100 in FIG. 1 (i.e., cell-free massive MIMO architecture with wireless fronthaul network and separate APs), the following setup was considered: the UEs and APs were randomly placed over an area of 100 m×100 m centered at (0, 0). Unless stated otherwise, the simulations assumed that K=10 UEs and M=100 APs were placed in this area. The CPU was located at $z_0=(x_0, y_0)$=(−D, 0), i.e., at a distance D=100 m away from the center of the square area. The simulations were averaged over 250 realizations. Each realization included randomly dropped APs and UEs (randomly adopting a uniform probability distribution).

Figure 6A:
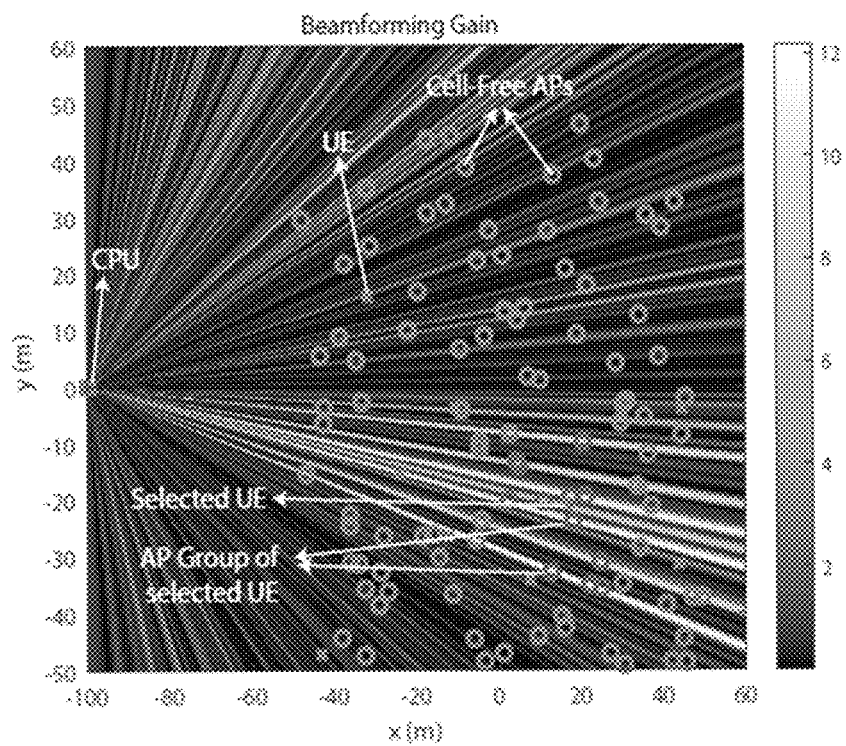
FIGS. 6A-6B are plots related to beamforming gains of optimized beamforming vectors for the groups of (a) 12 access points (APs) and (b) 25 APs in accordance with various exemplary embodiments.
Figure 6B:
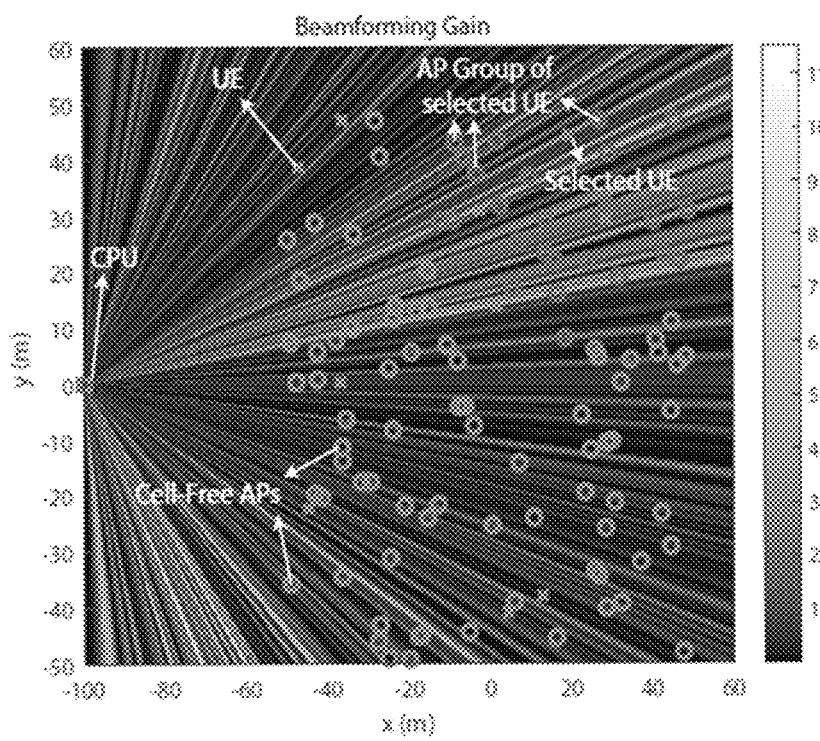

To evaluate the performance of the adopted fronthaul beamforming approach of the wireless-fronthaul based cell-free massive MIMO architecture discussed herein, the achievable beamforming gain for the considered deployment was plotted. See FIGS. 6A-6B, which are plots related to beamforming gains of optimized beamforming vectors for the groups of (a) 12 APs and (b) 25 APs in accordance with various exemplary embodiments. These figures show the beamforming gain in x-y coordinates for the two different AP group sizes. They provide a visual verification that the CPU focuses its multi-cast beam towards the APs in the group of interest. In terms of beamforming gain, it varied from 12 (i.e., around 11 dB) in the case of 12 APs group to 4 (i.e., around 6 dB) in the 25 APs group case. This highlights the trade-off between the fronthaul rate and access rate as the group sizes increases, as this decreases the fronthaul rate while increasing the access rate. It is noted that this fronthaul beamforming can be further improved when adopting hybrid precoding approaches known in the art. Moreover, leveraging machine learning may enable the autonomous design of these beamforming vectors/codebooks. This can further reduce the deployment overhead.

Figure 7A:
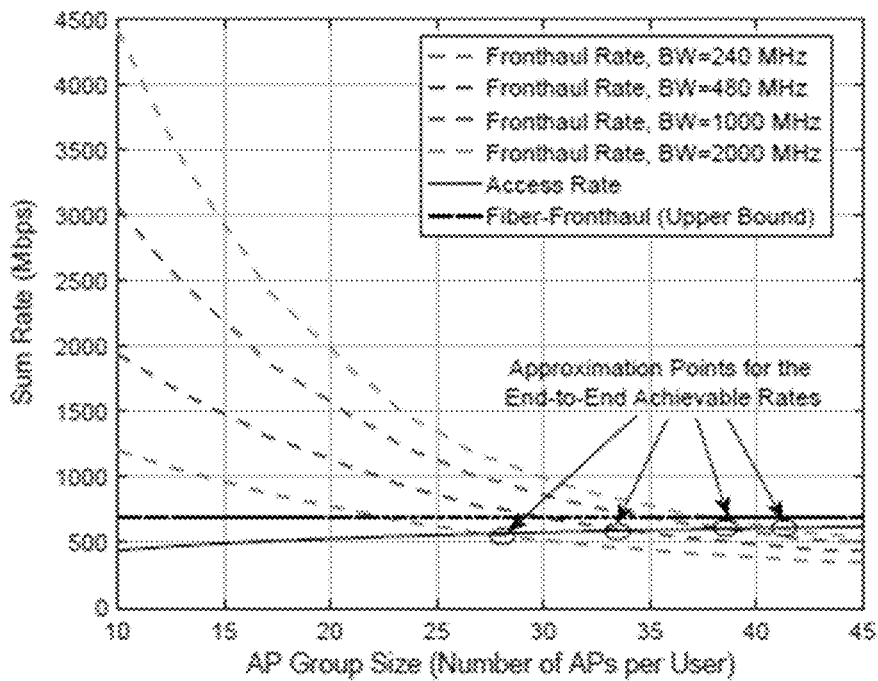
FIGS. 7A-7B are plots related to access channel and fronthaul sum data rates of a system architecture with different group sizes and fronthaul bandwidth values in accordance with various exemplary embodiments.
Figure 7B:
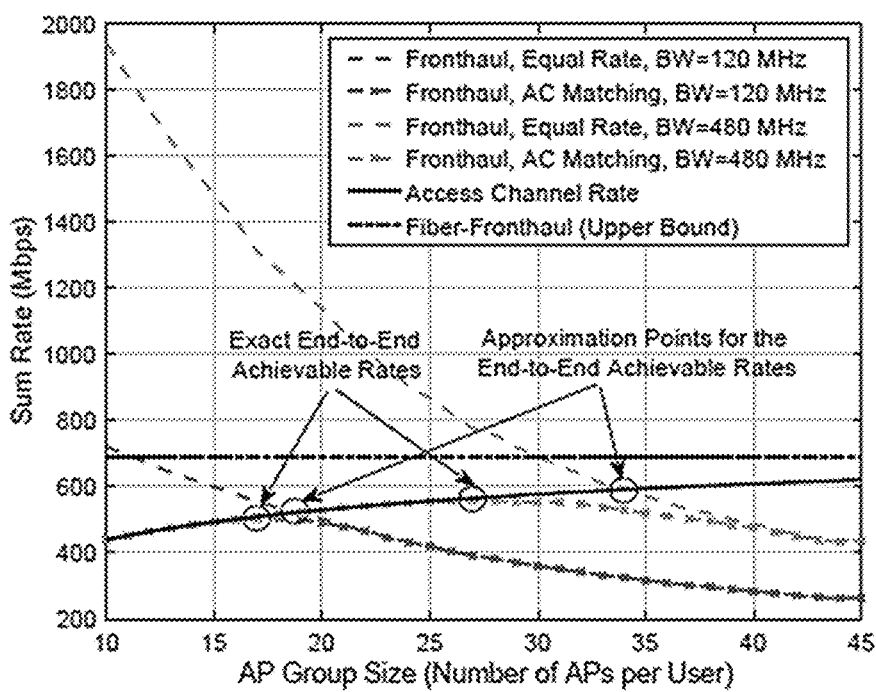

To evaluate the fronthaul and access achievable data rates using the rate optimization solutions discussed herein, the same setup was adopted, and the achievable fronthaul/access sum-rates were plotted. FIGS. 7A-7B are plots related to access channel and fronthaul sum data rates of a system architecture with different group sizes and fronthaul bandwidth values in accordance with various exemplary embodiments. The group for each user was determined based on the channel gain criterion described herein, the access rate was optimized based on the solution presented herein, and the fronthaul time allocation optimization was implemented based on the TDMA Optimization—Approach 1 as discussed herein. As shown in FIG. 7A, as the group size increases, the access channel data rate increases because of the higher access beamforming gain, and the fronthaul channel data rate decreases because of the lower fronthaul multicast beamforming gain. The intersection of the fronthaul/access rates can be considered as a good approximation for the achievable end-to-end sum data rate. As illustrated in FIG. 7A, with high enough fronthaul bandwidth, e.g., 2 GHz, the presented rate optimization approach and the cell-free massive MIMO architecture described herein could achieve around 620 Mbps sum-rate. This is very close to the 690 Mbps sum-rate achieved by the upper bound, which is given by the classical fiber-fronthaul based cell-free massive MIMO system.

Moreover, the exact achievable rate may be the one with matched fronthaul and access rates. To evaluate this exact rate, the fronthaul rate optimization discussed herein (TDMA Optimization—Approach 2), which ensures that the fronthaul rate of each link does not exceed its corresponding access rate, was adopted. FIG. 7B illustrates the plot of the achievable rates for the access and fronthaul links for this scenario. These rates represent the exact end-to-end achievable rates using the presented architecture. As shown in FIG. 7B, with sufficient fronthaul bandwidth, the exact achievable end-to-end data rates using the presented architecture are very comparable to the classical fiber-based cell-free massive MIMO architecture. For example, with 480 MHz fronthaul bandwidth, the presented solution achieved around 580 Mbps sum-rate compared to 690 Mbps for the fiber-based architecture. This difference can be further reduced by increasing the fronthaul bandwidth. It is also noted that the exact rate is close to the approximation discussed with reference to FIG. 7A.

Figure 8:
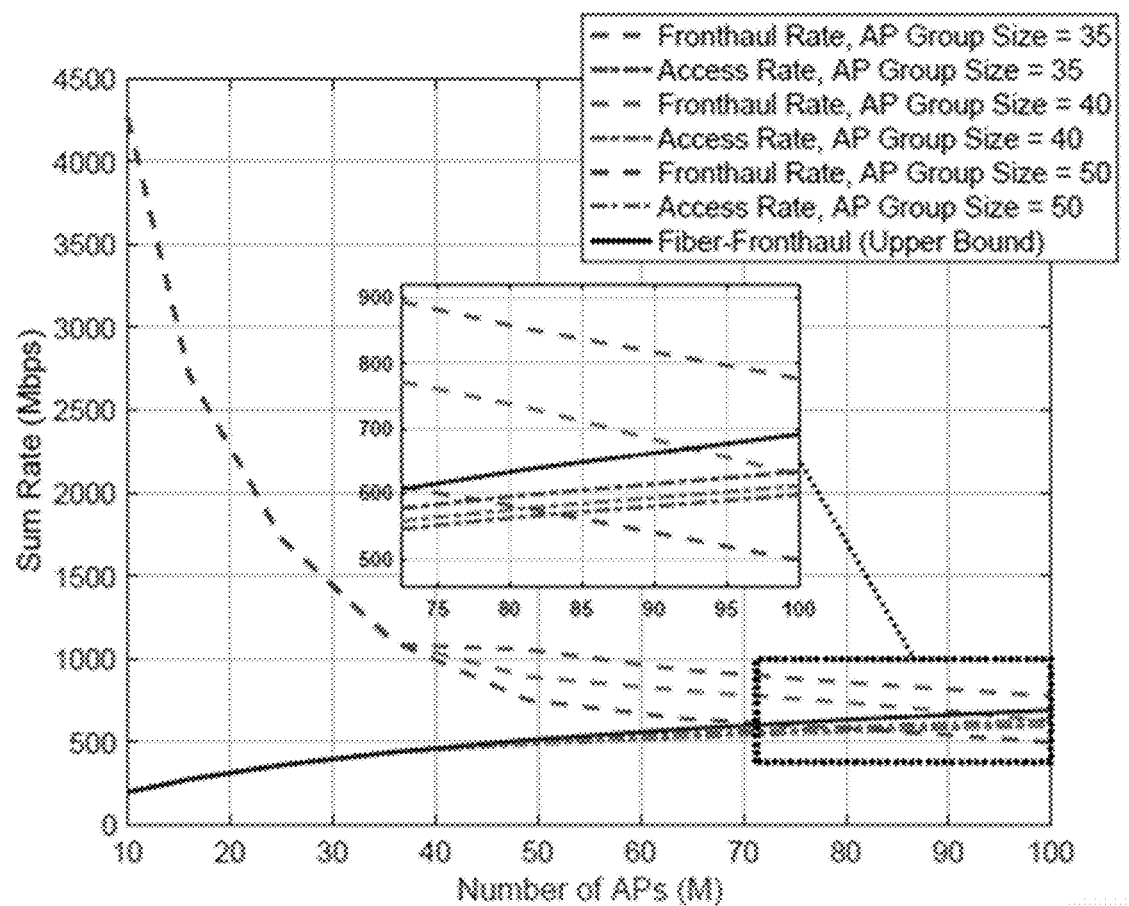
FIG. 8 is a plot related to access channel and fronthaul sum data rates of a system architecture with different numbers of randomly placed APs in accordance with various exemplary embodiments.

The scalability is a key objective of cell-free massive MIMO systems to be able to support more users/larger areas and to increase the beamforming gains/achievable rates. To draw some insights into the capability of the presented architecture in supporting large numbers of APs, the fronthaul/access rates vs. the number of APs, M, were plotted in FIG. 8. As shown in this figure, for each group size, the access data rates increase with denser APs due to the higher access beamforming gains. For the fronthaul links, adding more APs reduces the achievable rates due to the harder multicast beamforming design problem which leads to lower fronthaul beamforming gains. It is noted that when M≤G, the fronthaul rate decreases more rapidly as every new AP will also increase the effective group size and hence further complicates the beamforming design problem. Overall, however, the end-to-end data rates, which are approximately given by the intersections of the fronthaul and access channel rates, were increasing with more APs. This is also very comparable to the increase in data rates experienced by the fiber-based architecture.

Figure 9A:
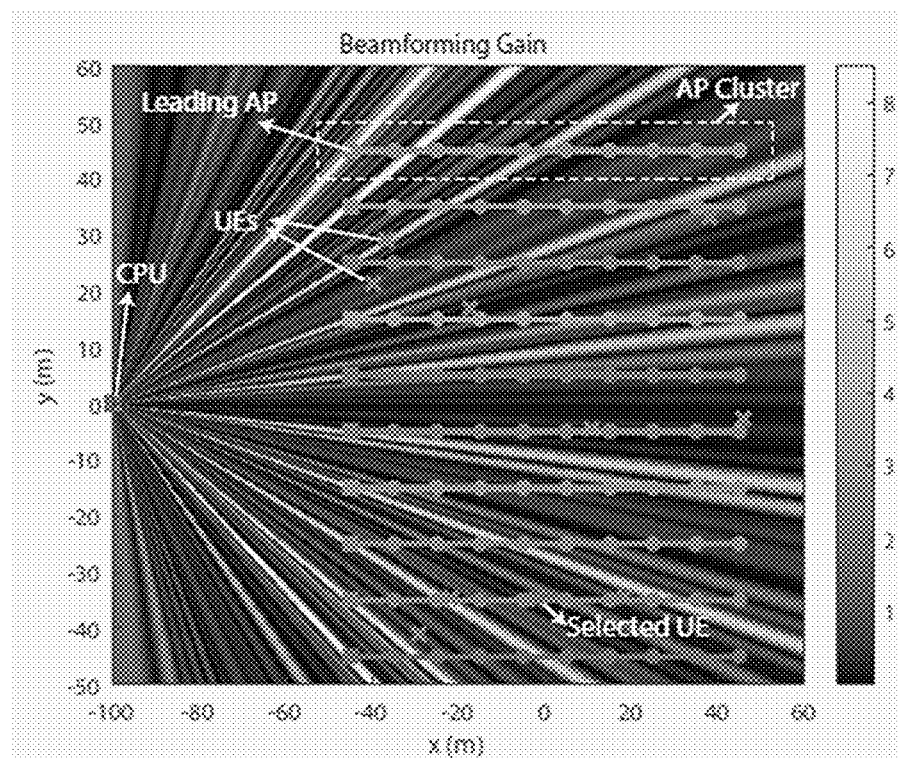
FIGS. 9A-9B are plots related to beamforming gains with optimized beamforming vectors within a mixed-fronthaul architecture of a cell-free massive MIMO system in accordance with various exemplary embodiments.
Figure 9B:
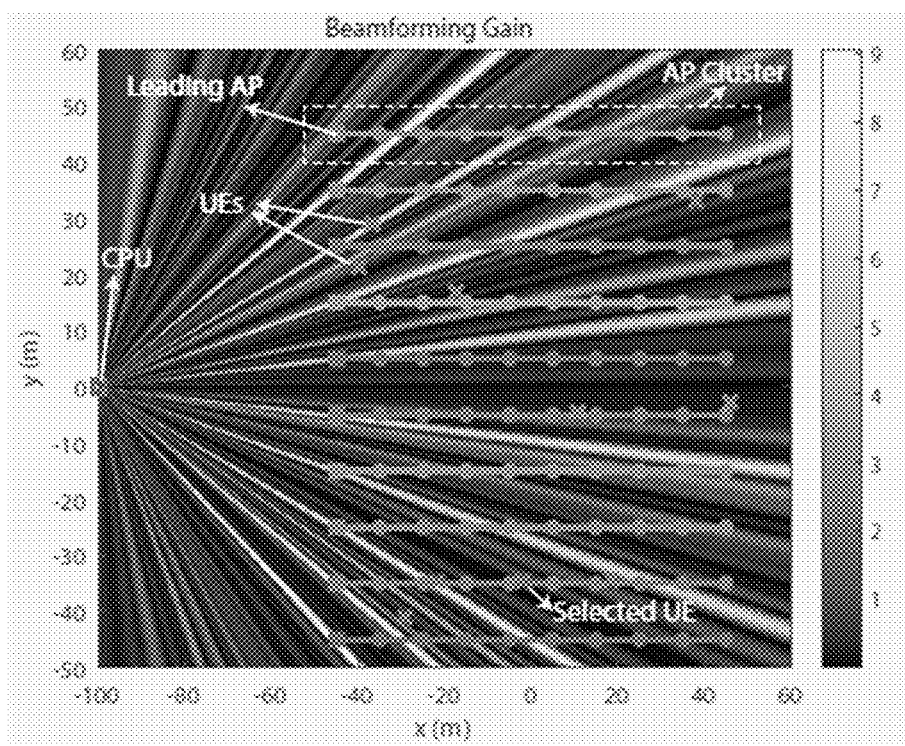

Furthermore, the performance of the modified architecture (e.g., system 200 of FIG. 2 with connected APs) was simulated. As shown in FIGS. 9A-9B, a square-grid of APs, where the APs are located uniformly in an 10×10 grid with equal distance between the rows and columns was considered. For simplicity, the 10 APs in each line in the y-axis were assumed to form a cluster. The leaders of the clusters (that communicate with the CPU through, e.g., the mmWave fronthaul network) are selected as the closest APs to the CPU. Further, K=10 UEs were randomly located in the 100 m×100 m area of interest. The CPU was located at the origin, as depicted in FIGS. 9A-9B, equipped with a ULA of N=128 antenna elements.

To evaluate the achievable data rates with the connected-APs cell-free massive MIMO architecture, the setup described in the previous paragraph was adopted, which is also depicted in FIGS. 9A-9B. For this setup, the achievable beamforming gains for different numbers of AP clusters per group were investigated. For example, one UE was considered, and the beamforming gains for the clusters serving this UE were plotted in two scenarios: (i) when a group of 10 AP clusters (i.e., all the clusters) jointly serve this UE as shown in FIG. 9A; and (ii) when a group of the 9 bottom clusters serve the UE, as shown in FIG. 9B. When the number of AP clusters per group increased, the beamforming gain decreased.

Figure 10:
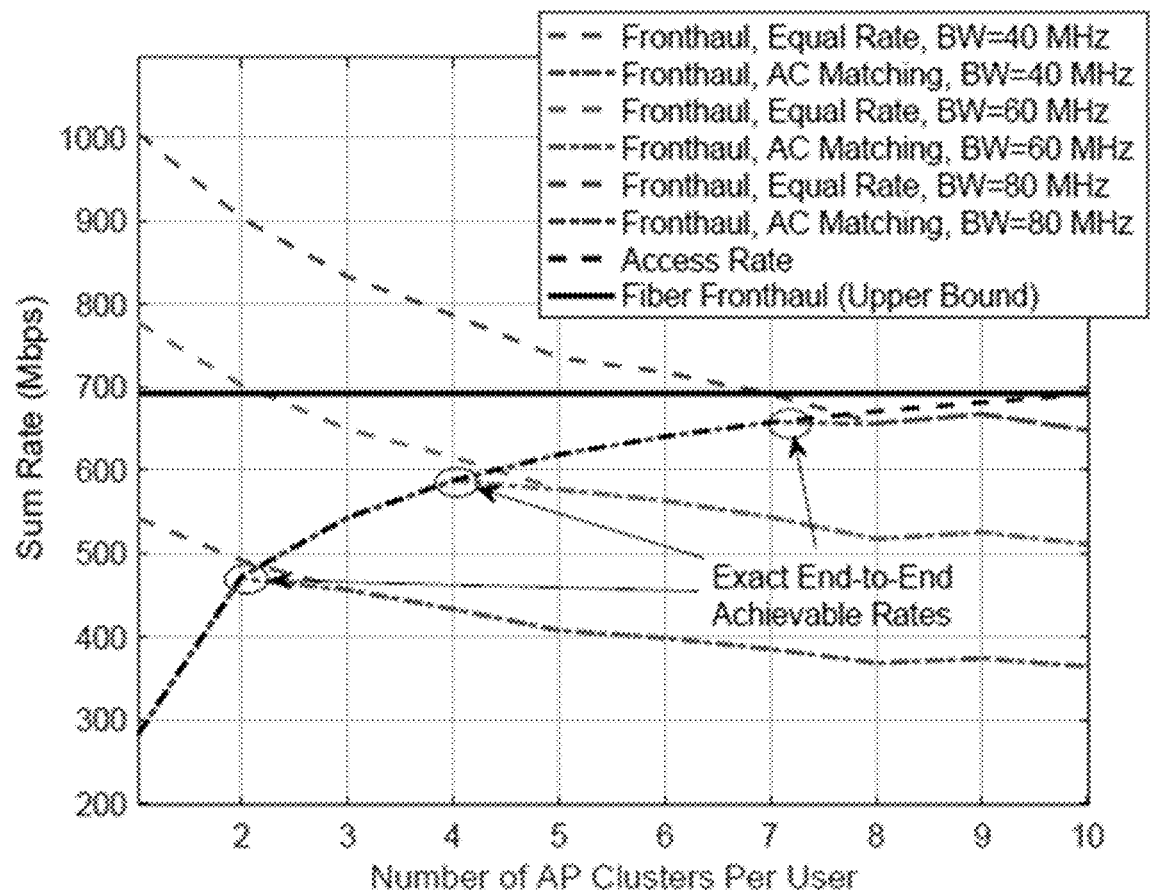
FIG. 10 is a plot related to sum rates for the fronthaul, access channel, and end-to-end sum data rates within a mixed-fronthaul architecture of a cell-free massive MIMO system in accordance with various exemplary embodiments.

Then, the achievable fronthaul and access rates of the same setup were calculated for different numbers of AP clusters per group (see FIG. 10). As shown in this figure, the modified architecture with connected APs had data rate gains compared to the separate APs architecture discussed with reference to FIGs. 7A-7B. With only 80 MHz fronthaul bandwidth, the proposed connected-APs architecture achieved nearly the same end-to-end data rates obtained by the upper bound, which is defined by the classical fiber-fronthaul based cell-free massive MIMO architecture.

As described herein, in order to achieve high data rates in the presented system architecture in accordance with various embodiments, factors such as for example (1) user-centric AP group selection, (2) fronthaul beamforming vectors, (3) group transmission schedule, and (4) AP power coefficients may be taken into consideration for optimizing the end-to-end data rates via, e.g., an iterative group selection algorithm (wherein the group size and AP selection may be determined based on the channel estimates and then the fronthaul/access data rates).

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in *In re Nuijten* to fall outside the scope of patentable subject matter under 35 § 101.

What is claimed is:

1. A central processing unit (CPU) of a communications network system, comprising:
   a plurality of antenna elements; and
   a processor coupled to the plurality of antenna elements and configured to:
      establish a first data communication link over a first frequency band between the CPU and a first access point (AP) of a first group of APs, wherein the first group of APs is selected to provide data communication between the CPU and a first user equipment (UE);
      cause the first AP to establish a second data communications link over a second frequency band between the first AP and the first UE; and transmit, via beamforming by the plurality of antenna elements, a portion of data to the first AP over the first data communications link, the portion of data configured to be relayed via the first AP to the first UE over the second data communications link, wherein:

the first data communications link and the second data communications link each comprise a wireless data communications link, the first frequency band comprises different frequency levels than frequency levels of the second frequency band, and the first group of APs or the first AP is configured to transmit data to a plurality of UEs including the first UE.

2. The CPU of claim 1, wherein:
the beamforming comprises an analog beamforming, a digital beamforming, or a hybrid beamforming.

3. The CPU of claim 1, wherein:
the beamforming comprises a digital beamforming or a hybrid beamforming; and
the CPU further comprises a non-transitory computer-readable storage medium in data communication with the processor and configured to store data associated with the digital beamforming or the hybrid beamforming.

4. A communications network system, comprising:
a plurality of antenna elements; and
a central processing unit (CPU) in data communication with a first access point (AP) configured to enable a data communication between the CPU and a first user equipment (UE), the CPU comprising a processor coupled with the plurality of antenna elements and configured to:

establish a first data communication link over a first frequency band between the CPU and the first AP of a first group of APs, wherein the first group of APs is selected to provide the data communication between the CPU and the first UE;

cause the first AP to establish a second data communications link over a second frequency band between the first AP and the first UE; and transmit, via beamforming by the plurality of antenna elements, a portion of data to the first AP over the first data communications link, the portion of data configured to be relayed via the first AP to the first UE over the second data communications link, wherein:

the first data communications link and the second data communications link each comprise a wireless data communications link, the first frequency band comprises different frequency levels than frequency levels of the second frequency band, and the first group of APs or the first AP is configured to transmit data to a plurality of UEs including the first UE.

5. The communications network system of claim 4, wherein:
the processor of the CPU is further configured to:
establish first additional data communications links over the first frequency band between the CPU and, respectively, other APs of the first group of APs;
cause each one of the other APs of the first group of APs to establish a respective second additional data communications link over the second frequency band between the each one of the other APs and the first UE; and transmit, via beamforming by the plurality of antenna elements, other portions of the data to the other APs of the first group of APs over the respective second additional data communications link, the other portions of the data configured to be relayed via the other APs to the first UE.

6. The communications network system of claim 4, wherein:
the processor of the CPU is further configured to:
obtain an end-to-end data rate of the data communication between the CPU and the first UE;
based on the obtained end-to-end data rate not exceeding a predetermined threshold, adjust the first group of APs by selecting a different group of APs;
transmit additional data from the CPU to the first UE via the different group of APs; and
achieve a higher end-to-end data rate for the transmission of the additional data than the obtained end-to-end data rate.

7. The communications network system of claim 6, wherein:
the processor of the CPU is further configured to:
achieve the higher end-to-end data rate than the obtained end-to-end data rate by at least one of adjusting beamforming vectors, adjusting a data transmission schedule, or causing adjustment of power coefficients associated with one or more APs.

8. The communications network system of claim 4, wherein:
the processor of the CPU is further configured to:
transmit data simultaneously to a plurality of groups of APs including the first group of APs each configured for the data communication with one or more UEs.

9. The communications network system of claim 4, wherein:
the first frequency band comprises a millimeter wave (mmWave) frequency band or a terahertz (THz) frequency band.

10. The communications network system of claim 4, wherein:
the second frequency band comprises a sub-6 gigahertz (GHz) frequency band or a millimeter wave (mmWave) frequency band.

11. The communications network system of claim 4, wherein:
the beamforming comprises an analog beamforming, a digital beamforming, or a hybrid beamforming.

12. The communications network system of claim 4, wherein:
the processor of the CPU is further configured to:
cause the first AP to establish a wired data communications link with one or more APs to send additional data to at least the first UE via the first data communications link and the wired data communications link; and
transmit, via beamforming by the plurality of antenna elements, at least portions of the additional data to the first AP, the at least portions of the additional data configured for transmission to at least the first UE via the wired data communications link.

13. The communications network system of claim 4, wherein the communications network system comprises a cell-free massive multiple-input multiple-output (MIMO) system.

14. A communications method, comprising:
establishing a first data communication link over a first frequency band between the CPU and a first access point (AP) of a first group of APs, wherein the first group of APs is selected to provide data communication between the CPU and a first user equipment (UE);
causing the first AP to establish a second data communications link over a second frequency band between the first AP and the first UE; and
transmitting, via beamforming by a plurality of antenna elements of the CPU, a portion of data to the first AP over the first data communications link, the portion of the data configured to be relayed via the first AP to the first UE over the second data communications link;
wherein:
the first data communications link comprises a first wireless data communications link,
the first frequency band comprises different frequency levels than frequency levels of the second frequency band, and
the first group of APs or the first AP is configured to transmit data to a plurality of UEs including the first UE.

15. The communications method of claim 14, further comprising:
establishing first additional data communications links over the first frequency band between the CPU and, respectively, other APs of the first group of APs;
causing each one of the other APs of the first group of APs to establish a respective second additional data communications link over the second frequency band between the each one of the other APs and the first UE;
transmitting, via beamforming by the plurality of antenna elements of the CPU, other portions of the data to the other APs of the first group of APs over the respective first additional data communications links, the other portions of the data configured to be relayed via the other APs to the first UE over the respective second additional data communications link;
measuring an end-to-end data rate of the data communication between the CPU and the first UE; and
based on the measured end-to-end data rate not exceeding a predetermined threshold, repeating adjusting the first group of APs by selecting a different group of APs, transmitting additional data from the CPU to the first UE via the different group of APs, and achieving a higher end-to-end data rate for the transmission of the additional data than the measured end-to-end data rate.

16. The communications method of claim 15, wherein:
the achieving of the higher end-to-end data rate than the measured end-to-end data rate comprises at least one of adjusting beamforming vectors, adjusting a data transmission schedule, or causing adjustment of power coefficients associated with one or more APs.

17. The communications method of claim 14, wherein:
the second data communications link between the first AP and the first UE comprises a second wireless data communications link.

18. The communications method of claim 14, wherein:
the second data communications link between the first AP and the first UE comprises a wired data communications link.

19. The communications method of claim 18, further comprising:
distributing, via the first AP and the wired data communications link, information relating to synchronization or power signaling.

20. The communications method of claim 14, further comprising:
transmitting, via the first group of APs, data to other UEs in data communication with the first group of APs.

* * * * *